(12) United States Patent
Abedini et al.

(10) Patent No.: US 12,395,932 B2
(45) Date of Patent: Aug. 19, 2025

(54) TECHNIQUES FOR DISCONTINUOUS RECEPTION CONFIGURATIONS FOR NETWORK ENERGY SAVINGS

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/731,137

(22) Filed: Apr. 27, 2022

(65) Prior Publication Data

US 2023/0354192 A1 Nov. 2, 2023

(51) Int. Cl.
*H04W 52/02* (2009.01)

(52) U.S. Cl.
CPC .............................. *H04W 52/0225* (2013.01)

(58) Field of Classification Search
CPC ..... H04W 76/22; H04W 36/12; H04W 36/38; H04W 76/10; H04W 76/11; H04W 36/00; H04W 36/0011; H04W 52/0225; H04W 52/0216; H04W 52/02; Y02D 30/70
See application file for complete search history.

(56) References Cited

U.S. PATENT DOCUMENTS

| | | | | |
|---|---|---|---|---|
| 12,035,404 B2* | 7/2024 | Cirik | ..................... | H04B 7/0695 |
| 2011/0199951 A1* | 8/2011 | Kwon | ............... | H04W 52/0212 |
| | | | | 370/311 |
| 2014/0036742 A1* | 2/2014 | Charbit | ............. | H04W 72/1263 |
| | | | | 370/280 |
| 2015/0282080 A1* | 10/2015 | Maattanen | ............ | H04W 76/28 |
| | | | | 370/311 |
| 2016/0192433 A1* | 6/2016 | Deenoo | ................. | H04W 24/08 |
| | | | | 370/329 |
| 2017/0339744 A1* | 11/2017 | Latheef | ............. | H04W 52/0235 |
| 2018/0048986 A1* | 2/2018 | Adachi | ................. | H04W 76/14 |
| 2019/0215870 A1* | 7/2019 | Babaei | .................. | H04L 5/0092 |
| 2019/0387572 A1* | 12/2019 | Nam | ..................... | H04W 8/24 |
| 2019/0394082 A1* | 12/2019 | Cirik | ..................... | H04W 76/28 |
| 2020/0229093 A1* | 7/2020 | Ahmad | ............. | H04W 52/0209 |
| 2021/0410107 A1* | 12/2021 | Park | ...................... | H04W 76/27 |
| 2022/0046687 A1* | 2/2022 | Shrivastava | .......... | H04W 72/30 |

(Continued)

FOREIGN PATENT DOCUMENTS

EP 4307804 A1 * 1/2024 ............ H04W 72/02

*Primary Examiner* — Nathan S Taylor

(74) *Attorney, Agent, or Firm* — Holland & Hart / QUALCOMM Incorporated

(57) ABSTRACT

Methods, systems, and devices for wireless communications are described. A first network entity (e.g., a distributed unit (DU)) may receive, from a second network entity (e.g., a centralized unit (CU)), a control message indicating a common discontinuous reception (C-DRX) configuration associated with a set of user equipments (UEs) communicatively coupled to the first network entity, where the C-DRX configuration indicates a time period including an active duration and an inactive duration. The first network entity may then communicate with two or more of the set of UEs in accordance with the indicated C-DRX configuration during the active duration of the time period of the C-DRX configuration.

30 Claims, 17 Drawing Sheets

(56) References Cited

U.S. PATENT DOCUMENTS

| | | | |
|---|---|---|---|
| 2022/0183101 A1* | 6/2022 | Jang | H04W 24/10 |
| 2022/0312326 A1* | 9/2022 | Wu | H04W 76/28 |
| 2023/0037852 A1* | 2/2023 | Islam | H04L 5/0094 |
| 2023/0156858 A1* | 5/2023 | Freda | H04W 76/28 |
| | | | 370/329 |
| 2023/0171698 A1* | 6/2023 | Wei | H04W 72/23 |
| | | | 370/318 |
| 2023/0328840 A1* | 10/2023 | Cheng | H04W 8/005 |
| | | | 370/329 |
| 2023/0362960 A1* | 11/2023 | Adjakple | H04W 4/08 |
| 2024/0057106 A1* | 2/2024 | Hong | H04B 7/0626 |
| 2024/0064857 A1* | 2/2024 | Wang | H04W 76/10 |
| 2024/0215107 A1* | 6/2024 | Fu | H04W 52/0235 |
| 2024/0324068 A1* | 9/2024 | Shrivastava | H04W 52/0229 |

\* cited by examiner

TECHNIQUES FOR DISCONTINUOUS RECEPTION CONFIGURATIONS FOR NETWORK ENERGY SAVINGS

FIELD OF TECHNOLOGY

The following relates to wireless communications, including techniques for discontinuous reception (DRX) configurations for network energy savings.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, UEs may be configured with discontinuous reception (DRX) configurations including active and inactive durations. A network entity may attempt to align DRX configurations of UEs coupled to the network entity such that the inactive durations of the DRX configurations at least partially align to enable the network entity (and the UEs) to enter low-power modes during the aligned inactive durations. However, it may be difficult (or impossible) to align DRX configurations across all UEs in situations with large quantities of UEs and/or high-traffic conditions.

SUMMARY

The described techniques relate to improved methods, systems, devices, and apparatuses that support techniques for discontinuous reception (DRX) configurations for network energy savings. Generally, aspects of the present disclosure support signaling and configurations between components of the network and between the network and user equipments (UEs) which facilitate the ability of the network to align DRX configurations across UEs. As such, techniques described herein may improve DRX alignment across UEs (e.g., improve alignment of inactive periods across DRX configurations), which may improve power saving capabilities at the network. Techniques described herein may be used to determine/signal a common DRX (C-DRX) configuration which apply to multiple UEs, where the UEs and the network may communicate with one another during active durations of the C-DRX configuration, and enter low-power states of the C-DRX configuration.

A method for wireless communication at a first network entity is described. The method may include receiving, from a second network entity, a control message indicating a C-DRX configuration associated with a set of multiple UEs communicatively coupled to the first network entity, the C-DRX configuration indicating a time period including an active duration and an inactive duration and communicating with two or more of the set of multiple UEs in accordance with the indicated C-DRX configuration during the active duration of the time period of the C-DRX configuration.

An apparatus for wireless communication at a first network entity is described. The apparatus may include a processor, memory coupled with the processor, and instructions stored in the memory. The instructions may be executable by the processor to cause the apparatus to receive, from a second network entity, a control message indicating a C-DRX configuration associated with a set of multiple UEs communicatively coupled to the first network entity, the C-DRX configuration indicating a time period including an active duration and an inactive duration and communicate with two or more of the set of multiple UEs in accordance with the indicated C-DRX configuration during the active duration of the time period of the C-DRX configuration.

Another apparatus for wireless communication at a first network entity is described. The apparatus may include means for receiving, from a second network entity, a control message indicating a C-DRX configuration associated with a set of multiple UEs communicatively coupled to the first network entity, the C-DRX configuration indicating a time period including an active duration and an inactive duration and means for communicating with two or more of the set of multiple UEs in accordance with the indicated C-DRX configuration during the active duration of the time period of the C-DRX configuration.

A non-transitory computer-readable medium storing code for wireless communication at a first network entity is described. The code may include instructions executable by a processor to receive, from a second network entity, a control message indicating a C-DRX configuration associated with a set of multiple UEs communicatively coupled to the first network entity, the C-DRX configuration indicating a time period including an active duration and an inactive duration and communicate with two or more of the set of multiple UEs in accordance with the indicated C-DRX configuration during the active duration of the time period of the C-DRX configuration.

Some examples of the method, apparatuses, and non-transitory computer-readable medium described herein may further include operations, features, means, or instructions for receiving, from the second network entity, control signaling indicating one or more C-DRX configurations, where the C-DRX configuration may be included within the one or more C-DRX configurations, and where receiving the control message may be based on the control signaling.

Some examples of the method, apparatuses, and non-transitory computer-readable medium described herein may further include operations, features, means, or instructions for identifying one or more C-DRX configurations based on one or more parameters associated with wireless communications between the first network entity and the set of multiple UEs communicatively coupled to the first network entity, where the C-DRX configuration may be included within the one or more C-DRX configurations and transmitting, to the second network entity, a second control message indicating the one or more C-DRX configurations based on identifying the one or more C-DRX configurations, where receiving the control message may be based on transmitting the second control message.

Some examples of the method, apparatuses, and non-transitory computer-readable medium described herein may further include operations, features, means, or instructions for receiving, from the second network entity, a second C-DRX configuration associated with a second set of multiple UEs communicatively coupled to a third network entity different from the first network entity, where receiving the control message may be based on the second C-DRX configuration.

Some examples of the method, apparatuses, and non-transitory computer-readable medium described herein may further include operations, features, means, or instructions for transmitting, to the second network entity, a request for one or more DRX configurations associated with one or more additional network entities different from the first network entity, where receiving the second C-DRX configuration may be based on transmitting the request.

Some examples of the method, apparatuses, and non-transitory computer-readable medium described herein may further include operations, features, means, or instructions for receiving, from a UE of the set of multiple UEs, a request for a DRX configuration, where the C-DRX configuration may be based on the request.

Some examples of the method, apparatuses, and non-transitory computer-readable medium described herein may further include operations, features, means, or instructions for transitioning from a first power state to a second power state during the inactive duration of the time period of the C-DRX configuration, where the second power state may be associated with a lower power consumption compared to the first power state.

In some examples of the method, apparatuses, and non-transitory computer-readable medium described herein, the first network entity includes a distributed unit (DU) and the second network entity includes a centralized unit (CU).

In some examples of the method, apparatuses, and non-transitory computer-readable medium described herein, the control message may be received via an F1 interface between the first network entity and the second network entity or an Xn interface between the first network entity and the second network entity.

A method for wireless communication at a second network entity is described. The method may include selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration and transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

An apparatus for wireless communication at a second network entity is described. The apparatus may include a processor, memory coupled with the processor, and instructions stored in the memory. The instructions may be executable by the processor to cause the apparatus to select a C-DRX configuration from a set of multiple C-DRX configurations, the C-DRX configuration associated with a set of multiple UEs communicatively coupled to a first network entity, the C-DRX configuration indicating a time period including an active duration and an inactive duration and transmit, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

Another apparatus for wireless communication at a second network entity is described. The apparatus may include means for selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration and means for transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

A non-transitory computer-readable medium storing code for wireless communication at a second network entity is described. The code may include instructions executable by a processor to select a C-DRX configuration from a set of multiple C-DRX configurations, the C-DRX configuration associated with a set of multiple UEs communicatively coupled to a first network entity, the C-DRX configuration indicating a time period including an active duration and an inactive duration and transmit, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

Some examples of the method, apparatuses, and non-transitory computer-readable medium described herein may further include operations, features, means, or instructions for receiving a second control message indicating one or more parameters associated with wireless communications between the first network entity and the set of multiple UEs communicatively coupled to the first network entity, where the C-DRX configuration may be selected from the set of multiple C-DRX configurations based on the one or more parameters.

In some examples of the method, apparatuses, and non-transitory computer-readable medium described herein, the C-DRX configuration may be selected from the set of multiple C-DRX configurations based on a traffic load, a quantity of UEs included within the set of multiple UEs, a second C-DRX configuration associated with a third network entity communicatively coupled to the first network entity, or any combination thereof.

Some examples of the method, apparatuses, and non-transitory computer-readable medium described herein may further include operations, features, means, or instructions for transmitting, to the first network entity, a second C-DRX configuration associated with a second set of multiple UEs communicatively coupled to a third network entity different from the first network entity, where selecting the C-DRX configuration, transmitting the control message, or both, may be based on the second C-DRX configuration.

Some examples of the method, apparatuses, and non-transitory computer-readable medium described herein may further include operations, features, means, or instructions for receiving, from the first network entity, a request for one or more DRX configurations associated with one or more additional network entities different from the first network entity, where transmitting the second C-DRX configuration may be based on receiving the request.

Some examples of the method, apparatuses, and non-transitory computer-readable medium described herein may further include operations, features, means, or instructions for transmitting, to a third network entity, a second control message indicating the C-DRX configuration, where the first network entity includes a first CU, and where the third network entity includes a second CU.

Some examples of the method, apparatuses, and non-transitory computer-readable medium described herein may further include operations, features, means, or instructions for transmitting, to a third network entity, a request for one or more DRX configurations associated with one or more network entities communicatively coupled to the third network entity, where the first network entity includes a first CU, and where the third network entity includes a second CU and receiving, from the third network entity in response to the request, an indication of a second C-DRX configuration, where the C-DRX configuration may be selected from the set of multiple C-DRX configurations based on the second C-DRX configuration.

In some examples of the method, apparatuses, and non-transitory computer-readable medium described herein, the C-DRX configuration may be selected from the set of multiple C-DRX configurations based on an algorithm configured to reduce power consumption at the first network entity, the second network entity, or both.

In some examples of the method, apparatuses, and non-transitory computer-readable medium described herein, the first network entity includes a DU and the second network entity includes a CU.

In some examples of the method, apparatuses, and non-transitory computer-readable medium described herein, the control message may be transmitted to the first network entity via an F1 interface between the first network entity and the second network entity or an Xn interface between the first network entity and the second network entity.

A method for wireless communication at a UE is described. The method may include receiving, from a network entity, control signaling indicating a set of multiple DRX configurations, the set of multiple DRX configurations including at least a first DRX configuration and a second DRX configuration, transitioning from the first DRX configuration to the second DRX configuration based on a DRX switching pattern associated with the set of multiple DRX configurations, additional control signaling from the network entity, or both, and communicating with the network entity during an active duration of the second DRX configuration based on transitioning from the first DRX configuration to the second DRX configuration.

An apparatus for wireless communication at a UE is described. The apparatus may include a processor, memory coupled with the processor, and instructions stored in the memory. The instructions may be executable by the processor to cause the apparatus to receive, from a network entity, control signaling indicating a set of multiple DRX configurations, the set of multiple DRX configurations including at least a first DRX configuration and a second DRX configuration, transition from the first DRX configuration to the second DRX configuration based on a DRX switching pattern associated with the set of multiple DRX configurations, additional control signaling from the network entity, or both, and communicate with the network entity during an active duration of the second DRX configuration based on transitioning from the first DRX configuration to the second DRX configuration.

Another apparatus for wireless communication at a UE is described. The apparatus may include means for receiving, from a network entity, control signaling indicating a set of multiple DRX configurations, the set of multiple DRX configurations including at least a first DRX configuration and a second DRX configuration, means for transitioning from the first DRX configuration to the second DRX configuration based on a DRX switching pattern associated with the set of multiple DRX configurations, additional control signaling from the network entity, or both, and means for communicating with the network entity during an active duration of the second DRX configuration based on transitioning from the first DRX configuration to the second DRX configuration.

A non-transitory computer-readable medium storing code for wireless communication at a UE is described. The code may include instructions executable by a processor to receive, from a network entity, control signaling indicating a set of multiple DRX configurations, the set of multiple DRX configurations including at least a first DRX configuration and a second DRX configuration, transition from the first DRX configuration to the second DRX configuration based on a DRX switching pattern associated with the set of multiple DRX configurations, additional control signaling from the network entity, or both, and communicate with the network entity during an active duration of the second DRX configuration based on transitioning from the first DRX configuration to the second DRX configuration.

Some examples of the method, apparatuses, and non-transitory computer-readable medium described herein may further include operations, features, means, or instructions for receiving the DRX switching pattern via the control signaling, additional control signaling, or both, where transitioning from the first DRX configuration to the second DRX configuration may be based on the DRX switching pattern.

Some examples of the method, apparatuses, and non-transitory computer-readable medium described herein may further include operations, features, means, or instructions for receiving, from the network entity, the additional control signaling indicating an activation of the second DRX configuration, a deactivation of the first DRX configuration, or both, where the additional control signaling includes a downlink control information message, a medium access control-control element message, or both, and where transitioning from the first DRX configuration to the second DRX configuration may be based on the activation of the second DRX configuration, the deactivation of the first DRX configuration, or both.

Some examples of the method, apparatuses, and non-transitory computer-readable medium described herein may further include operations, features, means, or instructions for receiving, from the network entity, a control message that selectively modifies one or more parameters associated with the second DRX configuration, the one or more parameters including an offset, a cycle length, a timer, or any combination thereof and communicating with the network entity in accordance with a modified version of the second DRX configuration based on the control message.

Some examples of the method, apparatuses, and non-transitory computer-readable medium described herein may further include operations, features, means, or instructions for receiving, from the network entity via the control signaling, additional control signaling, or both, one or more C-DRX configurations associated with a set of multiple UEs including the UE, the one or more C-DRX configurations different from the set of multiple DRX configurations, receiving, from the network entity, a control message activating a C-DRX configuration from the one or more C-DRX configurations at the UE, and communicating with the network entity during an active duration of the C-DRX configuration based on the control message.

In some examples of the method, apparatuses, and non-transitory computer-readable medium described herein, the DRX switching pattern indicates a periodicity for switching between the set of multiple DRX configurations, one or more time durations during which the UE may be to operate in the set of multiple DRX configurations, or both.

A method for wireless communication at a network entity is described. The method may include transmitting control signaling that indicates a set of multiple DRX configurations associated with a UE, the set of multiple DRX configurations including at least a first DRX configuration and a second DRX configuration, transitioning from the first DRX configuration to the second DRX configuration based on a DRX switching pattern associated with the set of multiple DRX configurations, based on transmitting additional control signaling indicating a transition from the first DRX configuration to the second DRX configuration, or both, and communicating with the UE during an active duration of the second DRX configuration based on transitioning from the first DRX configuration to the second DRX configuration.

An apparatus for wireless communication at a network entity is described. The apparatus may include a processor, memory coupled with the processor, and instructions stored in the memory. The instructions may be executable by the processor to cause the apparatus to transmit control signaling that indicates a set of multiple DRX configurations associated with a UE, the set of multiple DRX configurations including at least a first DRX configuration and a second DRX configuration, transition from the first DRX configuration to the second DRX configuration based on a DRX switching pattern associated with the set of multiple DRX configurations, based on transmitting additional control signaling indicating a transition from the first DRX configuration to the second DRX configuration, or both, and communicate with the UE during an active duration of the second DRX configuration based on transitioning from the first DRX configuration to the second DRX configuration.

Another apparatus for wireless communication at a network entity is described. The apparatus may include means for transmitting control signaling that indicates a set of multiple DRX configurations associated with a UE, the set of multiple DRX configurations including at least a first DRX configuration and a second DRX configuration, means for transitioning from the first DRX configuration to the second DRX configuration based on a DRX switching pattern associated with the set of multiple DRX configurations, based on transmitting additional control signaling indicating a transition from the first DRX configuration to the second DRX configuration, or both, and means for communicating with the UE during an active duration of the second DRX configuration based on transitioning from the first DRX configuration to the second DRX configuration.

A non-transitory computer-readable medium storing code for wireless communication at a network entity is described. The code may include instructions executable by a processor to transmit control signaling that indicates a set of multiple DRX configurations associated with a UE, the set of multiple DRX configurations including at least a first DRX configuration and a second DRX configuration, transition from the first DRX configuration to the second DRX configuration based on a DRX switching pattern associated with the set of multiple DRX configurations, based on transmitting additional control signaling indicating a transition from the first DRX configuration to the second DRX configuration, or both, and communicate with the UE during an active duration of the second DRX configuration based on transitioning from the first DRX configuration to the second DRX configuration.

Some examples of the method, apparatuses, and non-transitory computer-readable medium described herein may further include operations, features, means, or instructions for transmitting the DRX switching pattern via the control signaling, additional control signaling, or both, where transitioning from the first DRX configuration to the second DRX configuration may be based on the DRX switching pattern.

Some examples of the method, apparatuses, and non-transitory computer-readable medium described herein may further include operations, features, means, or instructions for transmitting the additional control signaling indicating an activation of the second DRX configuration, a deactivation of the first DRX configuration, or both, where the additional control signaling includes a downlink control information message, a medium access control-control element message, or both, and where transitioning from the first DRX configuration to the second DRX configuration may be based on the activation of the second DRX configuration, the deactivation of the first DRX configuration, or both.

Some examples of the method, apparatuses, and non-transitory computer-readable medium described herein may further include operations, features, means, or instructions for transmitting a control message that selectively modifies one or more parameters associated with the second DRX configuration, the one or more parameters including an offset, a cycle length, a timer, or any combination thereof and communicating with the UE in accordance with a modified version of the second DRX configuration based on the control message.

Some examples of the method, apparatuses, and non-transitory computer-readable medium described herein may further include operations, features, means, or instructions for transmitting, to the UE, one or more C-DRX configurations associated with a set of multiple UEs including the UE, the one or more C-DRX configurations different from the set of multiple DRX configurations, transmitting, to the UE, a control message activating a C-DRX configuration from the one or more C-DRX configurations at the UE, and communicating with the UE during an active duration of the C-DRX configuration based on the control message.

DETAILED DESCRIPTION

Figure 1:
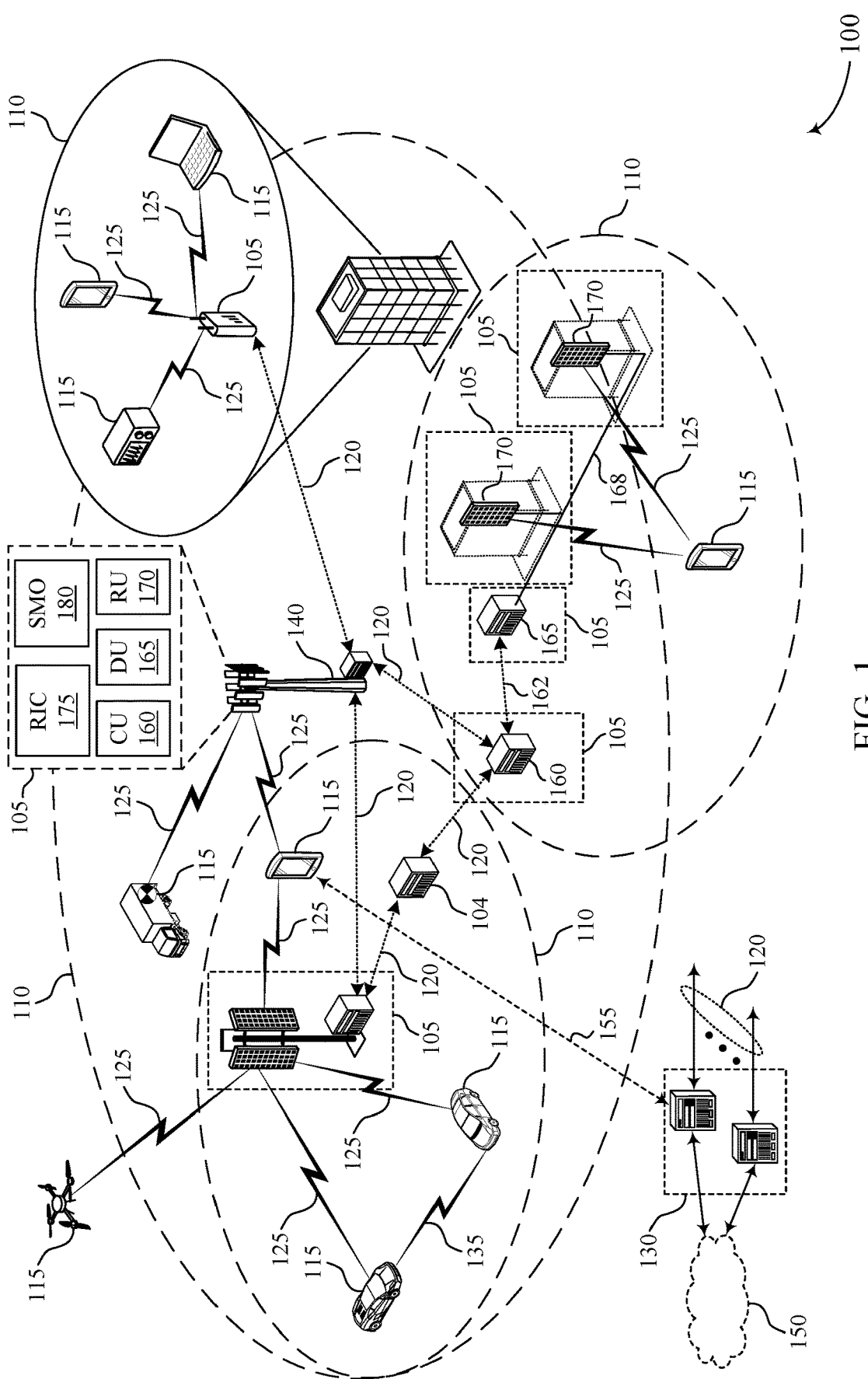
FIG. 1 illustrates an example of a wireless communications system that supports techniques for discontinuous reception (DRX) configurations for network energy savings in accordance with one or more aspects of the present disclosure.

In some wireless communications systems, user equipments (UEs) may be configured with discontinuous reception (DRX) configurations including active and inactive durations. The UE may be configured to perform wireless communications during the active durations of the DRX configuration, and enter a low-power state (e.g., "go to sleep") during the inactive durations of the DRX configuration. In order to enable the network entity to also enter a low-power state during inactive durations of DRX configurations, the network entity may attempt to align DRX configurations of UEs coupled to the network entity such that the inactive durations of the DRX configurations at least partially align. In such cases, the network entity may be able to enter a low power state and conserve power during periods of time which include overlapping inactive periods of the respective DRX configurations.

However, it may be difficult (or impossible) to align DRX configurations across all UEs in situations with large quantities of UEs and/or high-traffic conditions. The inability to align DRX configurations across UEs may reduce or eliminate the amount of time a network entity may enter a low-power state, thereby reducing power saving capabilities at the network entity. Moreover, DRX configurations for UEs may be determined or configured via multiple components of the network, such as by a central unit (CU) and a distributed unit (DU). As such, determining DRX configurations for UEs may result in excessive communications between the CU and the DU, thereby increasing a latency that DRX configurations are determined and reducing power saving capabilities at the network.

Accordingly, some aspects of the present disclosure are directed to signaling and configurations between components of the network (e.g., between a DU and a CU, or between CUs) and between the network and UEs which facilitate the ability of the network to align DRX configurations across UEs. As such, techniques described herein may improve DRX alignment across UEs (e.g., improve alignment of inactive periods across DRX configurations), which may improve power saving capabilities at the network. In particular, some aspects of the present disclosure are directed to signaling and configurations usable to determine (and indicate) common DRX (C-DRX) configurations which apply to multiple UEs, where the UEs and the network may communicate with one another during active durations of the C-DRX configuration, and enter low-power states during inactive durations of the C-DRX configuration.

For example, some aspects of the present disclosure are directed to signaling between network entities (e.g., between a CU and a DU, or between CUs) which enable the network to efficiently determine C-DRX configurations which apply to multiple UEs. In some cases, a DU and a CU may exchange information regarding candidate C-DRX configurations usable for UEs via the F1 and/or Xn interfaces. In some aspects, the DU may be configured request DRX configurations associated with other DUs associated with the CU. Moreover, the DU may be configured to identify (and propose/recommend to the CU) candidate C-DRX configurations based on C-DRX configurations used by neighboring DUs. In some aspects, the CU may select a C-DRX configuration from the candidate C-DRX configurations based on traffic conditions (e.g., traffic load), and may indicate the selected C-DRX configuration to the DU and the UEs.

Signaling between components of the network described herein may facilitate efficient identification and selection of C-DRX configurations used for wireless communications between DUs and UEs within the network. In particular, techniques described herein may reduce control signaling between DUs and CUs (and between CUs) used for identifying C-DRX configurations, thereby reducing duplicated processing operations and reducing network power consumption. Moreover, techniques for efficient C-DRX selection may reduce a latency with which C-DRX configurations are selected and enabled, thereby enabling the network to enter low-power states during inactive durations of the C-DRX configuration. Further, signaling between components of the network described herein may reduce a latency with which C-DRX configurations are selected and enabled, which may expedite the activation of C-DRX configurations and improve network power savings.

Additional or alternative aspects of the present disclosure are directed to signaling between the network and UEs which enable UEs to be configured with multiple DRX configurations, and efficiently switch between DRX configurations. For example, a UE may be configured with multiple DRX configurations, and may transition between the DRX configurations based on: (1) a pre-defined switching pattern, and/or (2) dynamic signaling from the network (e.g., downlink control information (DCI) or medium access control (MAC) control element (MAC-CE) messaging activating/deactivating DRX configurations).

By enabling UEs to efficiently transition between DRX configurations, the network may be able to more efficiently accommodate network traffic according to some DRX configurations, while preserving some level of power-saving by aligning DRX configurations across UEs according to other DRX configurations. In particular, the network may configure UEs with a first set of DRX configurations which may accommodate larger traffic volume, and a second set of DRX configurations which facilitate improved power savings at the UE and the network (e.g., DRX configurations with longer inactive durations). As such, by providing techniques which enable UEs and the network to efficiently switch between DRX configurations, techniques described herein may enable the network to more efficiently balance traffic and power-saving considerations.

Aspects of the disclosure are initially described in the context of wireless communications systems. Additional aspects of the disclosure are described in the context of example process flows. Aspects of the disclosure are further illustrated by and described with reference to apparatus diagrams, system diagrams, and flowcharts that relate to techniques for DRX configurations for network energy savings.

FIG. 1 illustrates an example of a wireless communications system 100 that supports techniques for DRX configurations for network energy savings in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a centralized or central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for DRX configurations for network energy savings as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some aspects, the wireless communications system 100 may support signaling and configurations between components of the network (e.g., between a DU and a CU, or between CUs) and between network entities 105 and UEs 115 which facilitate the ability of the network to align DRX configurations across UEs 115. As such, techniques described herein may improve DRX alignment across UEs 115 (e.g., improve alignment of inactive periods across DRX configurations), which may improve power saving capabilities at the network. In particular, the wireless communications system 100 may support signaling and configurations usable to determine (and indicate) C-DRX configurations which apply to multiple UEs 115, where the UEs 115 and the network may communicate with one another during active durations of the C-DRX configuration, and enter low-power states during inactive durations of the C-DRX configuration.

For example, some aspects of the present disclosure are directed to signaling between network entities 105 (e.g., between a CU and a DU, or between CUs) which enable the network to efficiently determine C-DRX configurations which apply to multiple UEs 115. In some cases, a DU and a CU may exchange information regarding candidate C-DRX configurations usable for UEs 115 via the F1 and/or Xn interfaces. In some aspects, the DU may be configured request DRX configurations associated with other DUs associated with the CU. Moreover, the DU may be configured to identify (and propose/recommend to the CU) candidate C-DRX configurations based on C-DRX configurations used by neighboring DUs. In some aspects, the CU may select a C-DRX configuration from the candidate C-DRX configurations based on traffic conditions (e.g., traffic load), and may indicate the selected C-DRX configuration to the DU and the UEs 115. Subsequently, the UEs 115 may communicate with the network entity 105 in accordance with the indicated C-DRX configurations. As such, the C-DRX configurations may enable the UEs 115 and the network entity 105 to communicate with one another during the active durations of the C-DRX configuration, and enter low-power states during inactive durations of the C-DRX configuration.

Techniques described herein directed to signaling between components of the network may facilitate efficient identification and selection of C-DRX configurations used for wireless communications between DUs and UEs 115 within the wireless communications system 100. In particular, techniques described herein may reduce control signaling between DUs and CUs (and between CUs) used for identifying C-DRX configurations, thereby reducing duplicated processing operations and reducing network power consumption. Moreover, techniques for efficient C-DRX selection may reduce a latency with which C-DRX configurations are selected and enabled, thereby enabling the network to enter low-power states during inactive durations of the C-DRX configuration. Further, signaling between components of the network described herein may reduce a latency with which C-DRX configurations are selected and enabled, which may expedite the activation of C-DRX configurations and improve network power savings.

Additionally, or alternatively, the wireless communications system 100 may be configured to support signaling between the network and UEs 115 which enable UEs 115 to be configured with multiple DRX configurations, and efficiently switch between DRX configurations. For example, a UE 115 of the wireless communications system 100 may be configured with multiple DRX configurations, and may transition between the DRX configurations based on: (1) a pre-defined switching pattern, and/or (2) dynamic signaling from the network (e.g., DCI or MAC-CE) which activates/deactivates DRX configurations.

Techniques described herein directed to signaling between the network and UEs 115 may enable UEs 115 to be configured with multiple C-DRX configurations, and to efficiently switch between DRX configurations. By enabling UEs 115 to efficiently transition between DRX configurations, the network may be able to more efficiently accommodate network traffic according to some DRX configurations, while preserving some level of power-saving by aligning DRX configurations across UEs 115 according to other DRX configurations. In particular, the network may configure UEs 115 with a first set of DRX configurations which may accommodate larger traffic volume, and a second set of DRX configurations which facilitate improved power savings at the UE 115 and the network (e.g., DRX configurations with longer inactive durations). As such, by providing techniques which enable UEs 115 and the network to efficiently switch between DRX configurations, techniques described herein may enable the network to more efficiently balance traffic and power-saving considerations.

Figure 2:
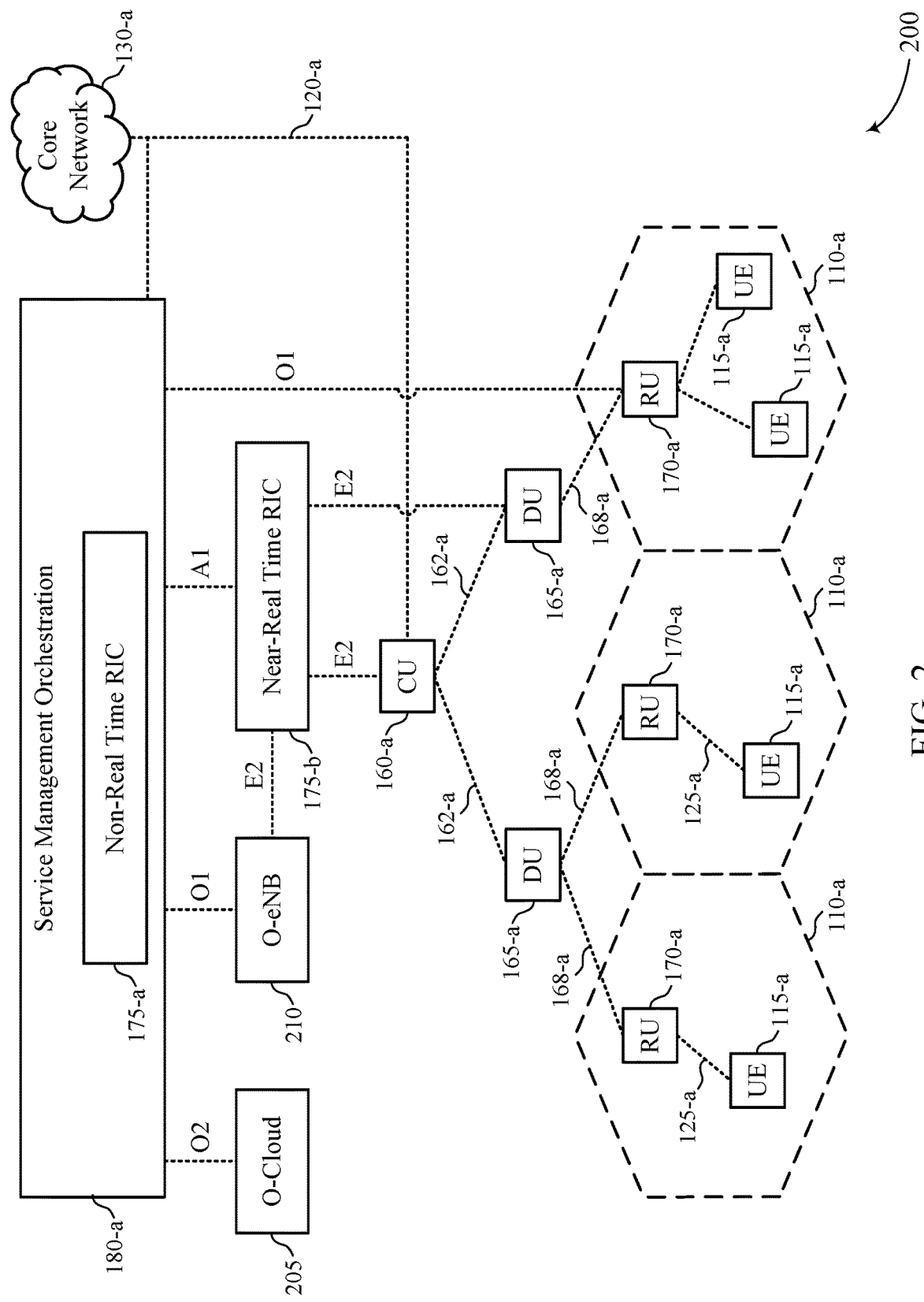
FIG. 2 illustrates an example of a network architecture that supports techniques for DRX configurations for network energy savings in accordance with one or more aspects of the present disclosure.

FIG. 2 illustrates an example of a network architecture 200 that (e.g., a disaggregated base station architecture, a disaggregated RAN architecture) that supports techniques for DRX configurations for network energy savings in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
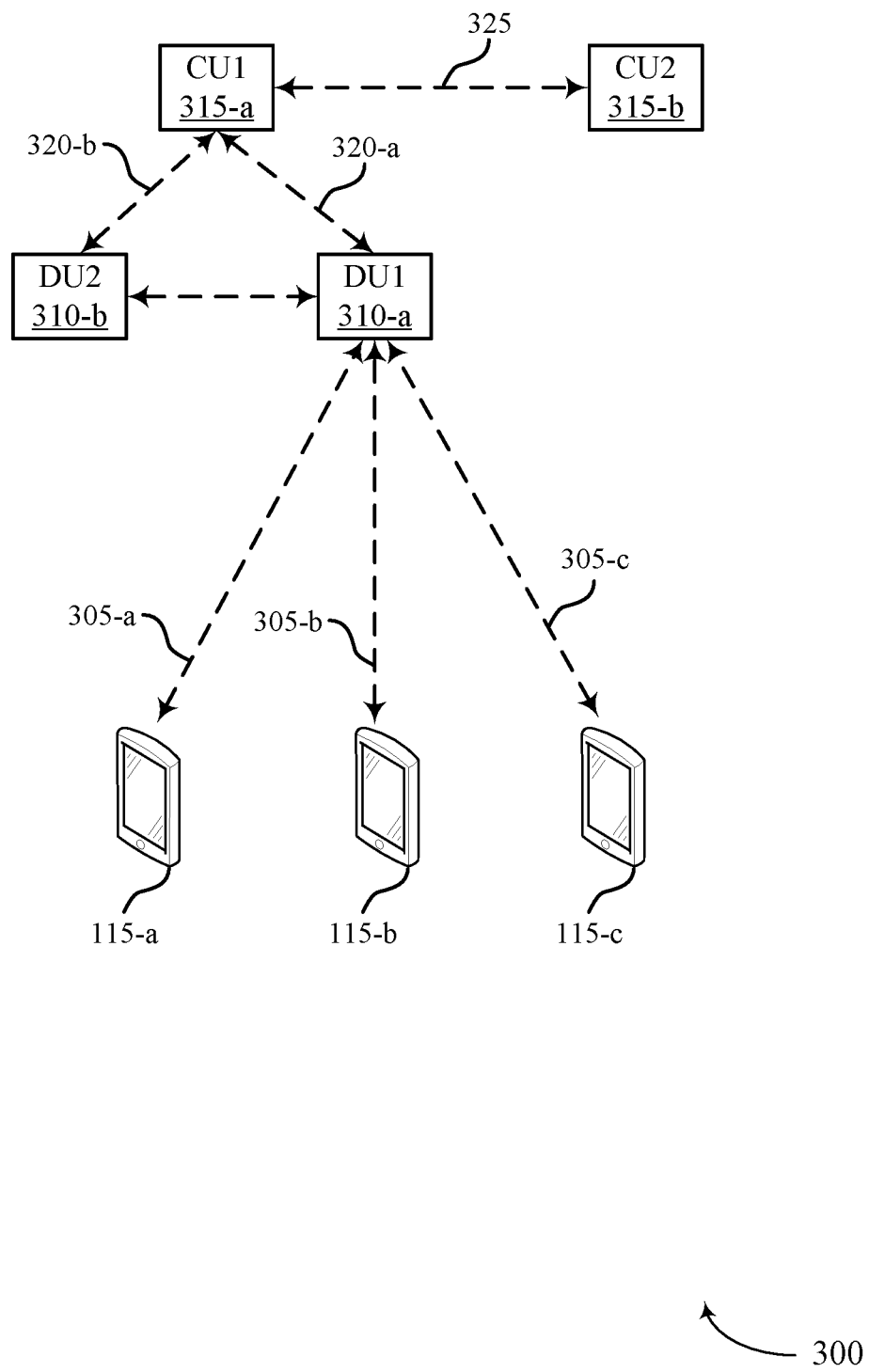
FIG. 3 illustrates an example of a wireless communications system that supports techniques for DRX configurations for network energy savings in accordance with one or more aspects of the present disclosure.

FIG. 3 illustrates an example of a wireless communications system 300 that supports techniques for DRX configurations for network energy savings in accordance with one or more aspects of the present disclosure. In some examples, aspects of the wireless communications system 300 may implement, or be implemented by, aspects of the wireless communications system 100, the network architecture 200, or both. In particular, the wireless communications system 300 may support signaling between network entities 105 or components of a network entity 105 (e.g., between DUs 310 and CUs 315), as well as signaling between the network entities 105 and UEs 115, which enables the network to configure the UEs 115 with DRX configurations (e.g., C-DRX configurations) which facilitate power saving at the network, as described herein.

The wireless communications system 300 may include a first UE 115-*a*, a second UE 115-*b*, a third UE 115-*c*, and a set of network entities including a first DU 310-*a* (DU1), a second DU 310-*b* (DU2), a first CU 315-*a* (CU1) and a second CU 315-*b* (CU2), which may be examples of network entities 105 and UEs 115 as described with reference to FIGS. 1 and 2. The DUs 310 and the CUs 315 may generally be referred to as "network entities 105," as described with reference to FIGS. 1 and 2.

The first UE 115-*a*, the second UE 115-*b*, and the third UE 115-*c* may communicate with the first DU 310-*a* using communication links 305-*a*, 305-*b*, and 305-*c*, respectively, which may be an example of NR or LTE links between the respective UEs 115-*a* and the DU 310-*a*. In some cases, the communication link 305 between the UEs 115 and the DU 310-*a* may include an example of access links (e.g., Uu links) which may include bi-directional links that enable both uplink and downlink communication. For example, the first UE 115-*a* may transmit uplink signals, such as uplink control signals or uplink data signals, to one or more components of the first DU 310-*a* using the communication link 305-*a*, and one or more components of the first DU 310-*a* may transmit downlink signals, such as downlink control signals or downlink data signals, to the first UE 115-*a* using the communication link 305-*a*.

Moreover, the first DU 310-*a* and the second DU 310-*b* may communicate with the first CU 315-*a* via respective midhaul communication links 320-*a* and 320-*b*, respectively. The midhaul communications links 320-*a*, 320-*b* may be examples of F1 links over the F1 interface. Further, the first CU 315-*a* and the second CU 315-*b* may communicate via a communication link 325, which may be an example of a communication link associated with the Xn interface. In some aspects, the second CU 315-*b* may be communicatively coupled to one or more DUs 310, where the DUs 310 may be further communicatively coupled to additional sets of UEs 115.

As noted previously herein, in some wireless communications systems, UEs 115 may be configured with DRX configurations including active and inactive durations. For example, the first UE 115-*a* may be configured to perform wireless communications during active durations of a DRX configuration, and enter a low-power state (e.g., "go to sleep") during inactive durations of the DRX configuration. In some aspects, DRX configurations are UE-specific, in that the DRX configurations are configured on a per-UE basis (e.g., DRX configurations configured on a UE-by-UE basis). For example, in some cases, the first UE 115-*a* may be configured with a first DRX configuration, the second UE 115-*b* may be configured with a second DRX configuration, and the third UE 115-*c* may be configured with a third DRX configuration. However, it may be difficult (or impossible) to align DRX configurations across all UEs 115 in situations with large quantities of UEs 115 and/or high-traffic conditions. The inability to align DRX configurations across UEs 115 may reduce or eliminate the amount of time a network entity may enter a low-power state, thereby reducing power saving capabilities at the network entity.

In some implementations, a UE 115 may be configured with up to two DRX groups per cell group, where each serving cell belongs to a single DRX group. For example, the first UE 115-*a* may be configured with a first DRX group and a second DRX group. In some aspects, each DRX group may be associated with a different frequency range, where each cell in the second DRX group may be associated with the same frequency range that is different from the frequency range of the cells in the first DRX group.

In the context of dual connectivity, UEs 115 may be communicatively coupled to multiple serving cells and/or multiple cell groups (e.g., primary node, secondary node). For example, while operating in dual connectivity, the first UE 115-*a* may be communicatively coupled to a primary network entity 105 (e.g., primary/master cell, master cell group (MCG)) and a secondary network entity 105 (e.g., secondary cell, secondary cell group (SCG)). In such dual connectivity cases, as part of a CGConfig, a secondary network entity 105 communicatively coupled to the first UE 115-*a* may indicate DRX information associated with the SCG (e.g., drx-infoSCG) to the primary/master network entity 105. In such cases, a CU 315 of the master network entity 105 may share the drx-infoSCG with the associated DU 310. Moreover, as part of the CGConfig-Info, the primary/master network entity 105 may share DRX information with the secondary network entity 105, such as DRX information associated with the MCG (e.g., drx-infoMCG, drx-infoMCG2), and DRX alignment information, such as alignedDRX-Indication (e.g., whether the first UE 115-*a* requires DRX alignment between MCG and SCG).

Some wireless communications systems may additionally support C-DRX configurations. As compared to conventional DRX configurations which apply to a single UE 115 (e.g., configured on a per-UE basis), C-DRX configurations may apply to multiple UEs 115. For example, referring to the wireless communications system 300, the first UE 115-*a*, the second UE 115-*b*, and the third UE 115-*c* may be configured with a C-DRX configuration, where the respective UEs 115 are configured to communicate during active durations of the C-DRX configuration, and enter lower power states during inactive durations of the C-DRX configuration.

Some wireless communications systems may utilize C-DRX configurations to facilitate power saving at the UEs 115. In particular, C-DRX configurations may facilitate alignment of DRX cycles across MCGs and SCGs, which improves power saving at the UEs 115. Moreover, UEs 115 may benefit from (or require) alignment across DRX cycles/configurations across cells, such as MCG and SCG. Further, from the perspective of the cell/network, the cells/network may benefit from aligning DRX cycles of UEs 115 using C-DRX configurations in low-traffic scenarios to facilitate network energy saving.

DRX configurations associated with UEs 115 may be RRC-configured (e.g., configured via RRC signaling). Moreover, DRX configurations for UEs 115 may be determined or configured via multiple components of the network, such as by a CU 315, a DU 310, or both. Enabling DRX configurations to be determined by either CUs 315 and/or DUs 310 may provide flexibility to implement an energy-saving algorithm at the CU 315 or the DU 310 for determining a proper or appropriate set of DRX configurations for the UEs 115 coupled to the respective wireless devices.

However, the ability for both the CU 315 and the DU 310 to determine DRX configurations for UEs 115 may result in several complications and shortcomings. For example, to improve inter-operability within the wireless communications system 300, the DU 310-*a* and the CU 315-*a* may be manufactured and operated by different vendors with different implementations, which may result in the respective devices determining or suggesting conflicting DRX configurations. Additionally, the DU 310-*a* and the CU 315-*a* may have different objectives, which may further result in conflicting DRX configurations. For example, the DU 310-*a* may select DRX configurations to maximize DU 310-*a*'s own energy saving, where the CU 315-*a* may select DRX configurations to attempt to balance energy saving across multiple network nodes due to the CU 315-*a* having a more global view/objective as compared to the DU 310-*a*. Taken together, the inter-operability and conflicting objectives between the DU 310-*a* and the CU 315-*a* may result in the DU 310-*a* and CU 315-*a* determining/selecting different (e.g., conflicting) DRX configurations. Such conflicting DRX configurations may be resolved, for example, by one entity overriding the other entity's intended DRX configuration (e.g., CU overriding DU).

However, even in cases where conflicting DRX configurations are resolved between the DU 310-*a* and the CU 315-*a*, such a framework may result in significant procedural inefficiency. For example, the ability for both the DU 310-*a* and the CU 315-*a* to determine/select DRX configurations may result in increased control signaling and/or backhaul signaling overhead required to agree on a DRX configuration. Moreover, such a framework may result in increased power consumption, as processing operations for determining DRX configurations may be duplicated across the DU 310-*a* and CU 315-*a*. Further, disagreements between the DU 310-*a* and the CU 315-*a* may result in increased latency for determining DRX configurations. These shortfalls of the conventional framework for determining DRX configurations may be further exacerbated due to the fact that conflicts when determining DRX configurations may occur for many UEs 115, and may be addressed one-by-one via the UE-associated signaling.

Shortfalls of conventional approaches used to determine DRX configurations for UEs 115, as well as attendant advantages of the present disclosure, may be further illustrated in the context of a few examples.

In a first example, a UE 115 may operate in a dual-connectivity mode, and may communicate with an MCG and an SCG. In such cases, the MCG and the SCG may share DRX information with one another (e.g., exchange MCG DRX configuration and SCG DRX configuration). Moreover, the MCG may indicate that alignment of the DRX configurations across the MCG and SCG is expected. In other words, the MCG may indicate that the SCG is expected align the SCG DRX configuration for the UE 115 with the MCG DRX configuration (at least when the SCG belongs to the same frequency range as the MCG). In this example, the expectation that the SCG align the SCG DRX configuration with the MCG DRX configuration will reduce flexibility of the SCG in determining the SCG DRX configuration, particularly in cases where the SCG may want to select a DRX configuration that will reduce energy consumption at the SCG (e.g., by aligning DRX configurations/cycles of UEs 115 served by the SCG). In other words, some conventional techniques for determining DRX configurations may result in reduced DRX flexibility, and may hamper the ability of network entities to select DRX configurations which will reduce power consumption at the network.

In another example, a network may include multiple dual-connectivity UEs 115. For example, a network may include a set of UEs 115, where each of the UEs 115 is connected to a first network entity 105 (e.g., gNB1) and a second network entity 105 (e.g., gNB2). In this example, gNB1 may serve as the main or primary node for some of the UEs 115, and may serve as the secondary node for other UEs 115. Similarly, gNB2 may serve as the secondary node for some of the UEs 115, and may serve as the main/primary node for other UEs 115. In such cases, the existence of multiple dual-connectivity UEs 115 may complicate the determination/selection of DRX configurations across each of the UEs 115, particularly in cases where the respective secondary node (e.g., gNB1 and/or gNB2) are expected to align DRX configurations with those of the primary node. In particular, such cases may result in the respective nodes/cells selecting different/conflicting DRX configurations, which may be resolved by one cell or network entity 105 subsequently overriding the DRX configuration selected by another cell/network entity 105.

Accordingly, some aspects of the present disclosure are directed to signaling between network entities 105 (e.g., between DUs 310 and CUs 315, or between CUs 315) which facilitates coordination between the respective network entities (e.g., coordination between DU 310 and CU 315, coordination between CUs 315) to determine and select C-DRX configurations for a cell that will facilitate energy savings at the network. In other words, some techniques described herein may enable the network to determine C-DRX configurations for a cell or for a group of UEs 115, as compared to some conventional techniques which determine DRX configurations on a UE-by-UE basis.

For example, referring to the wireless communications system 300, some aspects of the present disclosure are directed to signaling between network entities 105 via midhaul and backhaul interfaces (e.g., F1 interfaces, Xn interfaces) which enables the respective network entities 105 to configure and share information regarding C-DRX configurations at UEs 115. In particular, some aspects of the present disclosure are directed to signaling between the DUs 310-*a*, 310-*b* and the CUs 315-*a*, 315-*b*, which enable the respective network entities 105 to determine and select a C-DRX configuration which will be used for wireless communications at the UEs 115-*a*, 115-*b*, and 115-*c*.

Signaling described herein used to facilitate selection of C-DRX configurations may include signaling between CUs 315 and DUs 310, between multiple CUs 315, or both. For example, when determining a C-DRX configuration which will be used for wireless communications between the UEs 115-*a*, 115-*b*, 115-*c* and the DU 310-*a*, the CU 315-*a* may indicate to the DU 310-*a* (e.g., via the communication link 320-*a*) one or more potential or candidate C-DRX configurations for cells supported by the DU 310-*a*, or groups of cells supported by the DU 310-*a*.

Moreover, the CU 315-*a* may share with the DU 310-*a* information associated with C-DRX configurations of cells belonging to another DU 310 and/or another CU 315. In particular, the CU 315-*a* may indicate C-DRX configurations used by neighboring DUs 310 and CUs 315 (e.g., C-DRX configurations used by the second DU 310-*b* and/or the second CU 315-*b*). Information regarding C-DRX configurations used by other network entities 105 may enable the DU 315-*a* and the DU 310-*a* to more efficiently determine and select a C-DRX configuration for the UEs 115-*a*, 115-*b*, 115-*c* and the DU 310-*a* which will reduce a possibility of interference attributable to wireless communications in neighboring cells.

Further, when determining a C-DRX configuration which will be used for wireless communications between the UEs 115-*a*, 115-*b*, 115-*c* and the DU 310-*a*, the DU 310-*a* may indicate to the CU 315-*a* one or more intended C-DRX configurations for cells or groups of cells associated with the DU 310-*a*. That is, the DU 315-*a* may indicate an intended or preferred C-DRX configuration to the CU 315-*a*, where the intended/preferred C-DRX configuration may be based on current or available C-DRX configurations at the UEs 115, a traffic load between the DU 310-*a* and the UEs 115, parameters of wireless communications between the DU 310-*a* and the UEs 115, C-DRX configurations at other (neighboring) network entities (e.g., C-DRX configurations used by the second DU 310-*b* and/or second CU 315-*b*), or any combination thereof. As such, in some cases, the DU 310-*a* may request for the CU 315-*a* to provide or indicate C-DRX configurations for cells associated with another DU 310 or CU 315 so that the DU 315-*a* can more efficiently suggest or request intended/preferred C-DRX configuration(s) that will be used for wireless communications between the DU 310-*a* and the UEs 115.

In some aspects, communication between the first CU 315-*a* and the second CU 315-*b* may also be used to facilitate efficient selection of C-DRX configurations that will be used for wireless communications between the DU 310-*a* and the UEs 115. For example, in some cases, the first CU 315-*a* and the second CU 315-*b* may share with one another information associated with C-DRX configurations used for cells associated with DUs 310 communicatively coupled to the respective CUs 315. For example, the second CU 315-*b* may indicate, to the first CU 315-*a*, C-DRX configurations used by DUs 310 communicatively coupled to the second CU 315-*b*. Additionally, the respective CUs 315-*a*, 315-*b* may be configured to request information associated with C-DRX configurations associated with cells/DUs 310 associated with the respective CUs 315. By exchanging information associated with C-DRX configurations at the respective CUs 315, the CUs 315 may be able to relay such C-DRX information to the DUs 310 and/or the UEs 115, which may enable more efficient C-DRX selection.

Furthermore, in some aspects, communications between the UEs 115 and the DU 310-*a* may be used to facilitate efficient selection of C-DRX configurations that will be used for wireless communications between the DU 310-*a* and the UEs 115. For example, the UEs 115 may request that the respective UEs 115 be configured with specific C-DRX configurations. Moreover, UEs 115 may indicate or request that DRX configurations be aligned across UEs 115 and/or across serving cells. For example, a secondary node may request a main node to configure C-DRX configurations (or alignment across DRX configurations) for a respective UE 115 or group of UEs 115 (e.g., UEs 115-*a*, 115-*b*, 115-*c*).

Signaling between the respective wireless devices of the wireless communications system 300 used to select C-DRX configurations for the respective UEs 115-*a*, 115-*b*, 115-*c* will be further shown and described with reference to FIG. 4.

As noted previously herein, by facilitating determination and selection of a C-DRX configuration that will be used across the UEs 115-*a*, 115-*b*, 115-*c*, techniques described herein may be used to improve network energy savings (e.g., energy savings at the DUs 310 and the CUs 315). In some cases, a cell (e.g., DU 310, CU 315) may go through cycles of energy savings and normal operations, and may therefore change (at least partially) DRX configurations of UEs 115 communicatively coupled to the respective cells. That is, depending on network traffic and energy saving expectations of a given cell, the cell may change between communications configurations (e.g., DRX configurations) which enable high quantities of traffic, and communications configurations which enable improved energy savings.

Some wireless communications systems have utilized different tools for transitioning between DRX configurations. For example, a cell may transparently skip sending any PDCCH messages within monitoring occasions associated with some active durations (e.g., ON durations) of DRX configurations to conserve power. However, this may result in UEs 115 unnecessarily monitoring for PDCCH on such occasions, and result in increased power consumption at the UEs 115 which could otherwise be prevented if the UEs 115 could skip PDCCH monitoring during the monitoring occasions. Moreover, a UE 115 may unnecessarily transmit uplink signals (e.g., periodic SRS, periodic CSI report, etc.) that could otherwise be canceled or skipped.

In other cases, cells may attempt to perform RRC reconfiguration of DRX parameters to strike a balance between traffic loads and network energy savings. However, RRC reconfiguration can be slow (e.g., increased latency adjusting DRX configurations), and incurs additional signaling overhead, and increased power consumption on over backhaul communication links for signaling between DUs 310 and CUs 315. RRC reconfiguration may also change DRX configurations of all the cells in the same DRX group. Another alternative is MAC-CE commands (e.g., DRX Command MAC CE or Long DRX Command MAC CE). However, the use of MAC-CE commands for adjusting communication configurations such as DRX configurations may suffer from limited applicability, as MAC-CE commands may only be sent to a UE 115 to transition the UE 115 outside active period for the current DRX cycle.

Some wireless communications systems have attempted to utilize wake-up signals (WUSs) to change DRX configurations (e.g., WUS having DCI format 2-6 with PS-RNTI). WUSs may be a useful tool in some circumstances. For example, in cases where a cell does not send a WUS for a few cycles, the UE 115 may not start an active period of the DRX configuration in any of the respective cycles (e.g., absence of WUS prevents the UE 115 from transitioning from an inactive duration of the DRX configuration to an active duration). However, with WUSs, UEs 115 may be expected to continue monitoring for WUSs, even during inactive durations of the DRX cycle. This increases power consumption at the UEs 115 in cases where the UEs 115 could otherwise be told to skip WUS monitoring, or transition to a operational state associated with even more power savings (e.g., prevent the UEs 115 from entering a deeper seep). Moreover, WUSs may enable UEs 115 to skip active durations (e.g., ON durations) in one cycle of a DRX period, and offers little to no flexibility with changing a duration of the active durations.

Lastly, some wireless communications systems have attempted to utilize DCI-based PDCCH adaptation to change DRX configurations. DCI-based PDCCH adaptation may allow UEs 115 to skip PDCCH monitoring for a certain time duration X (e.g., up to approximately one-hundred milliseconds or other desired time interval). However, this may only be suitable for short periods of time, and may not be useful in the context of long DRX cycles that can be up to approximately ten seconds long.

Accordingly, in order to enable UEs 115 and network entities 105 (e.g., DUs 310, CUs 315) of the wireless communications system 300 to efficiently and effectively transition between different DRX configurations, additional aspects of the present disclosure may enable UEs 115 to be configured with multiple DRX configurations, and to switch between DRX configurations based on a DRX switching pattern, based on dynamic signaling, or both.

For example, referring to the wireless communications system 300, each UE 115 may be configured with multiple candidate DRX configurations (or multiple sets of parameters for one or more DRX configurations). For instance, the first UE 115-*a* may be configured with a set of multiple DRX configurations per cell group, or multiple sets of parameters (e.g., ON/active duration, DRX cycle, wake up time) that may be used for a respective DRX configuration. In this example, the first UE 115-*a* may be configured to switch between DRX configurations based on a DRX switching pattern (e.g., a periodic pattern of switching across DRX configurations/parameters), based on dynamic signaling from the DU 310-*a* (e.g., a dynamic activation/deactivation of a DRX configuration or set of parameters via DCI or MAC-CE), or both.

In some cases, candidate DRX configurations configured at a respective UE 115 may be subject to some requirements or conditions (relative to a default DRX configuration). For example, in some cases, active durations (ON durations) of a DRX configuration may include a subset (and/or be shorter than) a default active/ON duration of a default DRX configuration. By way of another example, a cycle periodicity of DRX configurations which may be configured at a respective UE 115 may be longer than a default cycle, or the ON/active durations may be expected to overlap with (or be temporally close to) the default ON/active durations of a default DRX configuration. Stated differently, in some implementations, a set of candidate DRX configurations configured at a UE 115 may be expected to exhibit characteristics or parameters which are similar to one another and/or similar to those of a default or "baseline" DRX configuration.

Additionally, or alternatively, in order to strike a balance between facilitating network traffic and network power savings, the wireless communications system 300 may support dynamic reconfiguration of DRX parameters. In other words, the UE 115-*a* may be configured with a DRX configuration, and may receive dynamic signaling (e.g., DCI, MAC-CE) which modifies or adjusts one or more parameters of the DRX configuration, such as an offset, a cycle length, a timer, and the like.

Further, in addition to configuring each UE 115 with multiple candidate DRX configurations, sets of DRX configurations, the techniques descried herein may enable UEs 115 to be configured with one or more C-DRX configurations (via system information or RRC signaling) along with UE-specific DRX configurations. That is, each UE 115 of the wireless communications system 300 may be configured with a set of UE-specific DRX configurations, and one or more C-DRX configurations which are shared across the UEs 115-*a*, 115-*b*, 115-*c*. In such cases, the UEs 115 may be configured to switch between UE-specific DRX configurations and the C-DRX configuration(s) based on the DRX switching pattern, based on dynamic signaling, or both. For example, the network of the wireless communications system 300 (e.g., DU 310, CU 315) may be configured to transmit (e.g., broadcast, multicast, groupcast) a group-common DCI message that activates, deactivates, and/or modifies a C-DRX configuration for all 115-*a*, 115-*b*, 115-*c*, a specific group of UEs 115, or both.

The ability to switch between multiple candidate DRX configurations via a DRX switching pattern and/or dynamic signaling, as well as the ability to configure UEs 115 with both UE-specific DRX configurations and C-DRX configurations, will be further shown and described with reference to FIG. 5.

Figure 4:
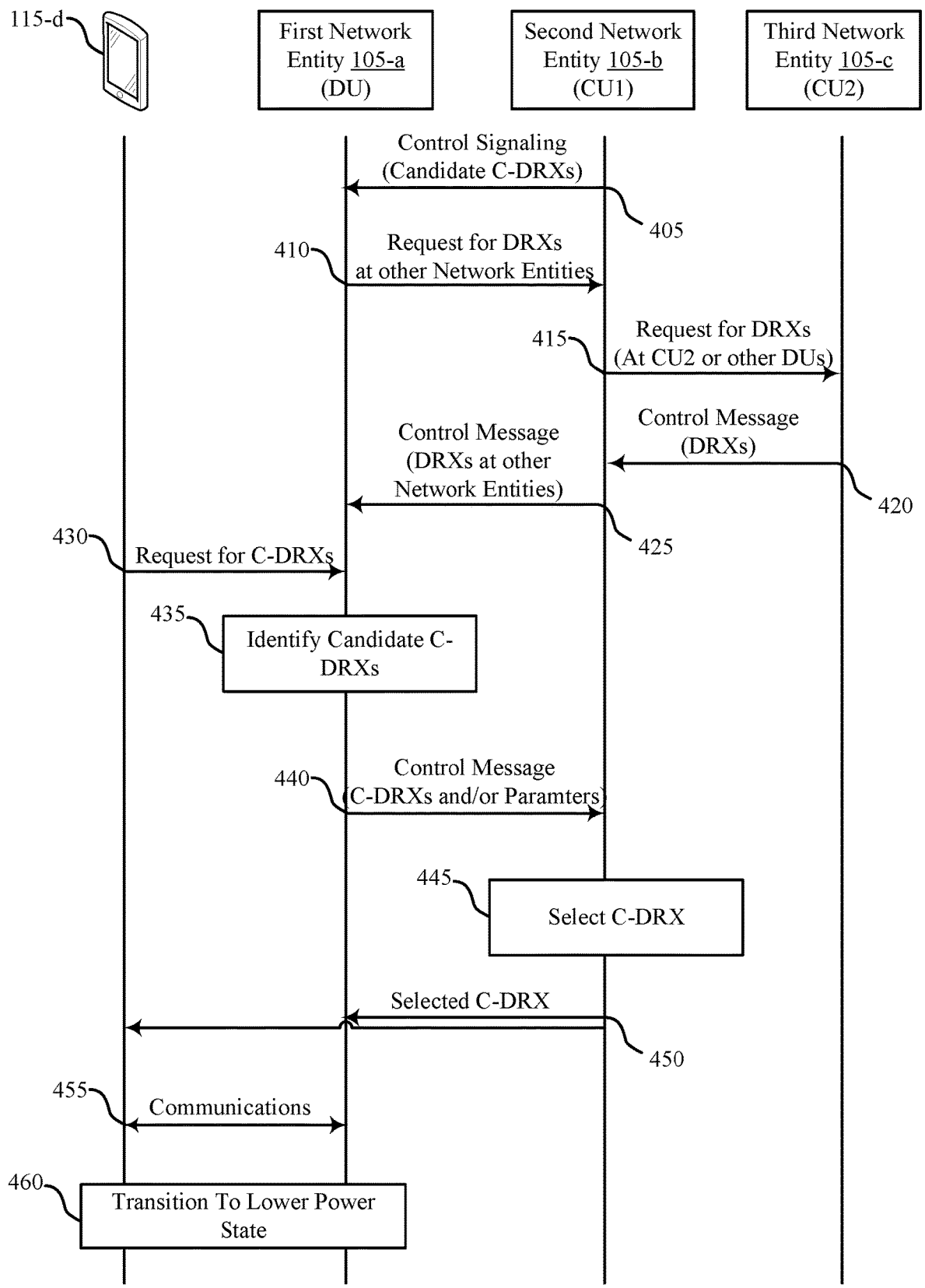
FIG. 4 illustrates an example of a process flow that supports techniques for DRX configurations for network energy savings in accordance with one or more aspects of the present disclosure.

FIG. 4 illustrates an example of a process flow 400 that supports techniques for DRX configurations for network energy savings in accordance with one or more aspects of the present disclosure. In some examples, aspects of the process flow 400 may implement, or be implemented by, aspects of the wireless communications system 100, the network architecture 200, the wireless communications system 300, or any combination thereof. In particular, the process flow 400 illustrates signaling between network entities 105 (e.g., DU and CU) of the network that facilitates the ability of the network to align DRX configurations across UEs 115, and facilitate power saving at the network, among other aspects.

The process flow 400 may include a UE 115-*d*, a first network entity 105-*a* (e.g., DU), a second network entity 105-*b* (e.g., CU1), and a third network entity 105-*c* (e.g., CU2), which may be examples of UEs 115 and network entities 105 as described with reference to FIGS. 1-3. For example, the UE 115-*d* illustrated in FIG. 4 may be an example of the first UE 115-*a* illustrated in FIG. 3. Similarly, the first network entity 105-*a*, the second network entity 105-*b*, and the third network entity 105-*c* illustrated in FIG. 4 may be examples of the first DU 310-*a*, the first CU 315-*a*, and the second CU 315-*b*, respectively, as illustrated in FIG. 3.

Figure 5:
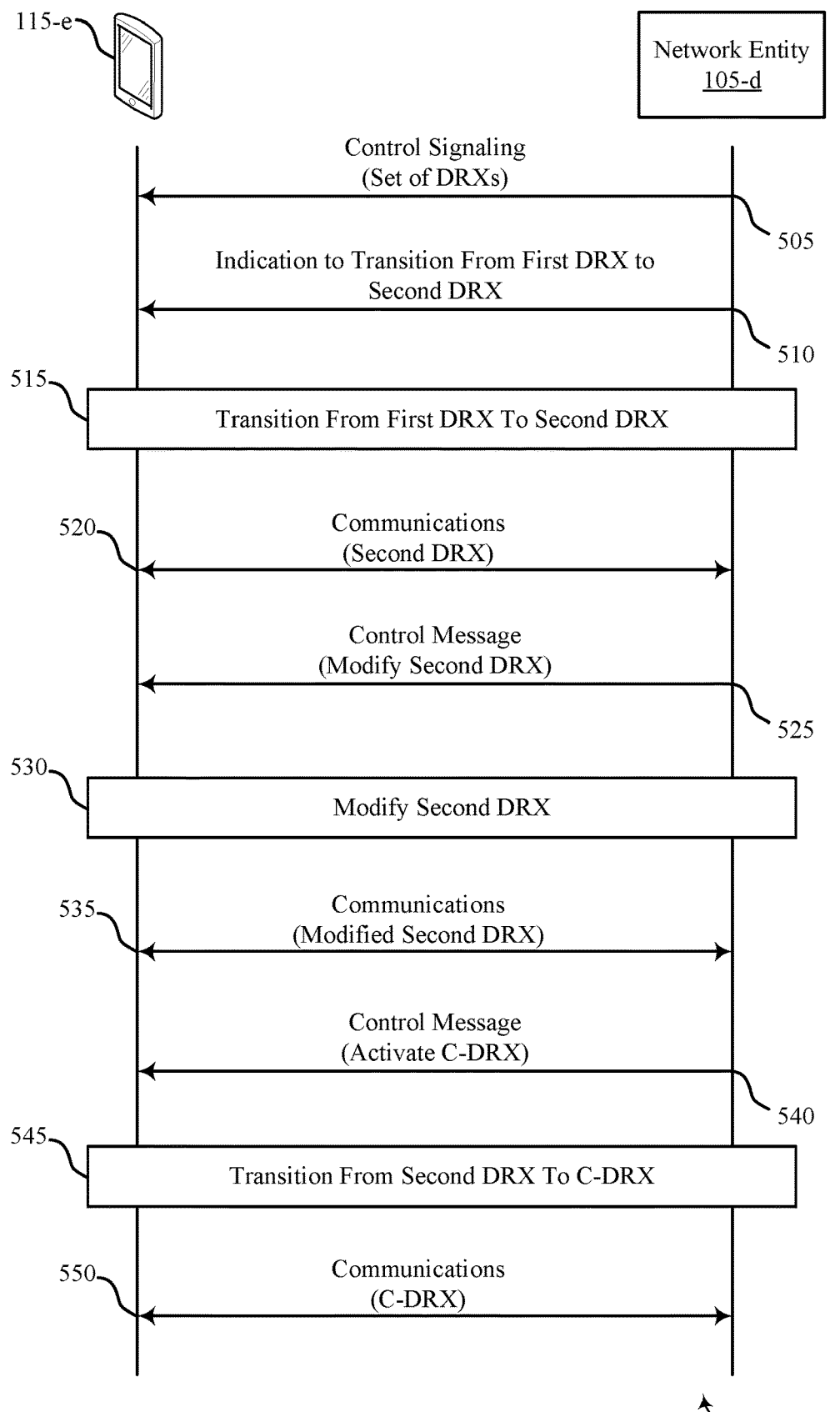
FIG. 5 illustrates an example of a process flow that supports techniques for DRX configurations for network energy savings in accordance with one or more aspects of the present disclosure.

In some aspects, signaling between the UE 115-*d* and the first network entity 105-*a* illustrated in FIG. 5 may be communicated via a Uu interface between the respective devices. Moreover, signaling between the respective network entities 105-*a*, 105-*b*, 105-*c* illustrated in FIG. 5 may be communicated via an F1 interface between the respective devices, an Xn interface between the respective devices, or both.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the first network entity 105-*a* may receive (e.g., obtain), from the second network entity 105-*b*, control signaling indicating one or more C-DRX configurations usable for wireless communications between the first network entity 105-*a* and the UE 115-*d*. In other words, the second network entity 105-*b* may indicate one or more candidate or potential C-DRX configurations. The control signaling at 305 may include RRC signaling, DCI signaling, system information signaling (e.g., SSB), or any combination thereof.

As noted previously herein, each candidate C-DRX configuration may include time periods (e.g., cycles) that include an active duration and an inactive duration, where the UE 115-*d* and the first network entity 105-*a* may be configured to communicate during the active duration, and enter lower-power operational states during the inactive duration.

At 410, the first network entity 105-*a* may transmit (e.g., output), to the second network entity 105-*b*, a request for one or more DRX configurations (e.g., C-DRX configurations) associated with one or more additional network entities 105. In some cases, the first network entity 105-*a* may transmit the request at 410 based on receiving the control signaling at 405.

For example, the first network entity 105-*a* may transmit a request for information associated with DRX configurations utilized by the third network entity 105-*c*, by DUs communicatively coupled to one of the second or third network entities 105-*b*, 105-*c*, or any combination thereof. As noted previously herein, information associated with DRX configurations implemented by neighboring network entities 105 or neighboring cells may be used to efficiently determine or select a C-DRX configuration that will be used between the UE 115-*d* and the first network entity 105-*a*.

At 415, the second network entity 105-*b* transmit (e.g., output), to the third network entity 105-*c*, a request for one or more DRX configurations (e.g., C-DRX configurations) associated with the third network entity 105-*c* and/or additional network entities 105 (e.g., DUs) communicatively coupled to the third network entity 105-*c*. In this regard, the second network entity 105-*b* may relay or forward the request that was received at 410.

At 420, the third network entity 105-*c* may transmit (e.g., output), to the second network entity 105-*b*, a control message indicating one or more DRX configurations (e.g., C-DRX configurations) associated with the third network entity 105-*c* and/or additional network entities 105 (e.g., DUs) communicatively coupled to the third network entity 105-*c*. For example, the third network entity 105-*c* may be communicatively coupled to a DU, and may transmit a control message indicating a DRX configuration (e.g., C-DRX configuration) used for wireless communications between the DU and a set of UEs 115. In some cases, the third network entity 105-*c* may transmit (and the second network entity 105-*b* may receive) the control message at 420 in response to the request at 415.

At 425, the second network entity 105-*b* may transmit (e.g., output), to the first network entity 105-*a*, a control message indicating the one or more DRX configurations (e.g., C-DRX configurations) associated with the third network entity 105-*c* (or DUs communicatively coupled to the third network entity 105-*c*). In other words, the second network entity 105-*b* may relay or forward the indication of the DRX configurations that were received via the control message at 420. Moreover, the first network entity 105-*a* may receive the indication of the DRX configurations at additional network entities 105 at 425 based on (e.g., in response to) transmitting the request at 410.

At 430, the first network entity 105-*a* may receive (e.g., obtain) a request for one or more DRX configurations from the UE 115-*d*. In other words, the UE 115-*d* may request that one or more DRX configurations be used for wireless communications between the UE 115-*d* and the first network entity 105-*a*. Additionally, or alternatively, the UE 115-*d* may be configured to request one or more parameters for a DRX configuration to be configured at the UE 115-*d*, such as a timer, a cycle length, a length of active or inactive durations, or any combination thereof. The request for the indicated DRX configuration and/or DRX parameters may be based on network conditions, a traffic load at the UE 115-*d*, power savings at the UE 115-*d*, or any combination thereof.

At 435, the first network entity 105-*a* may identify one or more C-DRX configurations that may be used for wireless communications between the first network entity 105-*a* and a group of UEs 115 including the UE 115-*d*. In other words, the first network entity 105-*a* may identify "intended" or candidate C-DRX configurations that may be used. In some implementations, the candidate C-DRX configurations determined by the first network entity 105-*a* at 435 may include a subset of the candidate C-DRX configurations indicated by the second network entity 105-*b* at 405.

In some aspects, the first network entity 105-*a* may identify the one or more candidate C-DRX configurations at 435 based on one or more parameters associated with wireless communications between the first network entity 105-*a* and the set of UEs 115 (including the UE 115-*d*) communicatively coupled to the first network entity 105-*a*. For example, the first network entity 105-*a* may identify the candidate C-DRX configurations based on a quantity of UEs 115 communicatively coupled to the first network entity 105-*a*, a traffic load, or both. In this regard, the first network entity 105-*a* may identify the one or more candidate C-DRX configurations at 435 based on the request for a C-DRX configuration (or DRX parameters) which was received at 430.

In additional or alternative implementations, the first network entity 105-*a* may identify the one or more candidate C-DRX configurations at 435 based on DRX configurations at other, neighboring network entities 105. In particular, the first network entity 105-*a* may identify candidate C-DRX configurations which may be less susceptible to interference attributable to communications performed according to C-DRX configurations associated with other network entities 105, or which are less likely to interfere with wireless communications performed with other network entities 105. For example, in some cases, the first network entity 105-*a* may identify the one or more one or more candidate C-DRX configurations at 435 based on receiving the indication of the DRX configurations at other network entities at 425.

Additionally, or alternatively, the first network entity 105-*a* may identify the one or more candidate C-DRX configurations at 435 based on (e.g., in accordance with) an algorithm configured to reduce power consumption at the first network entity 105-*a*, the second network entity 105-*b*, the UE 115-*d*, or any combination thereof.

At 440, the first network entity 105-*a* may transmit (e.g., output), to the second network entity 105-*b*, a control message indicating the one or more candidate C-DRX configurations which were identified at 435. Additionally, or alternatively, the control message may indicate DRX parameters associated with intended/candidate C-DRX configurations. In other words, the first network entity 105-*a* may indicate "intended" or candidate C-DRX configurations (and/or intended/candidate DRX parameters) which may be used for wireless communications between the first network entity 105-*a* and the set of UEs 115 including the UE 115-*d*.

At 445, the second network entity 105-*b* may select a C-DRX configuration that will be used for wireless communications between the first network entity 105-*a* and the set of UEs 115 including the UE 115-*d*. In some aspects, the second network entity 105-*b* may select the C-DRX configuration at 445 from the set of candidate C-DRX configurations indicated at 405 and/or 440. For example, the second network entity 105-*b* may select the C-DRX configuration from the set of candidate C-DRX configurations indicated at 405 based on one or more DRX parameters indicated via the control message at 440.

At 450, the second network entity 105-*b* may transmit (e.g., output), to the first network entity 105-*a*, the UE 115-*d*, or both, a control message indicating the C-DRX configuration which was selected at 445. In other words, the second network entity 105-*b* may indicate which C-DRX configuration is to be used for wireless communications between the UE 115-*d* and the first network entity 105-*a*. The control message transmitted to the UE 115-*d* may include an RRC message.

In some cases, the second network entity 105-*b* may transmit the control message indicating the selected C-DRX configuration at 450 based on transmitting the control signaling at 405, receiving the request at 410, receiving the control message at 440, or any combination thereof. For instance, the C-DRX configuration indicated at 450 may be included within the one or more candidate C-DRX configurations indicated via the control signaling at 405, the one or more candidate C-DRX configurations indicated via the control message at 440, or both.

In additional or alternative implementations, the second network entity 105-*b* may transmit an indication of the selected C-DRX configuration to the third network entity 105-*c*. Information associated with the selected C-DRX configuration may enable the third network entity 105-*c* (and wireless devices communicatively coupled to the third network entity 105-*c*) to select DRX configurations usable for the other respective wireless devices.

At 455, the first network entity 105-*a* may communicate with a set of UEs 115 (including the UE 115-*d*) in accordance with the selected C-DRX configuration indicated at 450. In particular, the network entity 105-*a* and the UE 115-*d* may communicate with one another during the active duration of the C-DRX configuration. In some aspects, the UE 115-*d* and the first network entity 105-*a* may be configured to operate in a first power state (e.g., first operational state) during the active duration of the C-DRX configuration.

The UE 115-*d* and the first network entity 105-*a* may communicate with one another in accordance with the selected C-DRX configuration based on receiving the control signaling at 405, transmitting the request at 410, receiving the control message at 425, receiving/transmitting the request at 435, identifying candidate C-DRX configurations at 435, transmitting the control message at 440, receiving the control message indicating the C-DRX configuration at 450, or any combination thereof.

For example, the second network entity **105-*b* may select the C-DRX configuration at 455 based on a traffic load, a quantity of UEs 115 coupled to the first network entity 105-*a*, DRX configurations at other neighboring network entities 105, or any combination thereof. Additionally, or alternatively, the second network entity 105-*b* may select the C-DRX configuration based on (e.g., in accordance with) an algorithm configured to reduce power consumption at the first network entity 105-*a*, the second network entity 105-*b*, the UE 115-*d***, or any combination thereof.

At 460, the first network entity **105-*a*, the UE 115-*d*, or both, may transition from the first power state to a second power state during the inactive duration of the C-DRX configuration, where the second power state is associated with a lower power consumption as compared to the first power state. In other words, the UE 115-*d* and the first network entity 105-*a*** may be configured to enter lower-power states in order to conserve power during the inactive durations of the C-DRX configuration.

Techniques described herein directed to signaling between components of the network may facilitate efficient identification and selection of C-DRX configurations used for wireless communications between DUs and UEs 115 within the wireless communications system. In particular, techniques described herein may reduce control signaling between DUs and CUs (and between CUs) used for identifying C-DRX configurations, thereby reducing duplicated processing operations and reducing network power consumption. Moreover, techniques for efficient C-DRX selection may reduce a latency with which C-DRX configurations are selected and enabled, thereby enabling the network to enter low-power states during inactive durations of the C-DRX configuration. Further, signaling between components of the network described herein may reduce a latency with which C-DRX configurations are selected and enabled, which may expedite the activation of C-DRX configurations and improve network power savings.

FIG. 5 illustrates an example of a process flow 500 that supports techniques for DRX configurations for network energy savings in accordance with one or more aspects of the present disclosure. In some examples, aspects of the process flow 500 may implement, or be implemented by, aspects of the wireless communications system 100, the network architecture 200, the wireless communications system 300, the process flow 400, or any combination thereof. In particular, the process flow 500 illustrates signaling between network entities 105 (e.g., DU and CU) of the network that facilitates the ability of the network to align DRX configurations across UEs 115, and facilitate power saving at the network, among other aspects.

The process flow 500 may include a UE **115-*e* and a network entity 105-*d*, which may be examples of UEs 115 and network entities 105 as described with reference to FIGS. 1-4. For example, the UE 115-*e* illustrated in FIG. 5 may be an example of the UE 115-*a* illustrated in FIG. 3, the UE 115-*d* illustrated in FIG. 4, or both. Similarly, the network entity 105-*d* illustrated in FIG. 5 may be an example of the first DU 310-*a* illustrated in FIG. 3, the first or second network entities 105-*a*, 105-*b* illustrated in FIG. 4**, or any combination thereof.

In some examples, the operations illustrated in process flow 500 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 505, the UE **115-*e* may receive (e.g., obtain) control signaling from the network entity 105-*d*, where the control signaling indicates a set of DRX configurations usable for wireless communications between the UE 115-*e* and the network entity 105-*d*. In this regard, the control signaling may indicate a set of candidate UE-specific DRX configurations that may be used at the UE 115-*e*. As noted previously herein, each candidate DRX configuration may include time periods (e.g., cycles) that include an active duration and an inactive duration, where the UE 115-*e* and the network entity 105-*d*** may be configured to communicate during the active duration, and enter lower-power operational states during the inactive duration. The control signaling may include RRC signaling, DCI signaling, system information signaling (e.g., SSB), or any combination thereof.

In some aspects, the UE **115-*e* and the network entity 105-*d* may be configured to switch between candidate DRX configurations indicated via the control signaling at 505 in accordance with a DRX switching pattern, based on dynamic signaling, or both. In this regard, in some implementations, the control signaling may indicate a DRX switching configuration that is to be used to switch between DRX configurations indicated at 505**. The DRX configuration may indicate a relative order in which the DRX configurations are to be used, time intervals or durations during which each DRX configuration is to be used or activated, a periodicity for switching between the DRX configurations, and the like.

In some implementations, in addition to indicating a set of UE-specific DRX configurations, the control signaling may indicate one or more C-DRX configurations usable for wireless communications between the network entity **105-*d* and a set of UEs 115 including the UE 115-*e*. In other words, the UE 115-*e* may be configured with both UE-specific DRX configurations and C-DRX configurations. In some aspects, the UE 115-*e* and the network entity 105-*d* may be configured to switch between UE-specific DRX configurations and C-DRX configurations based on the DRX switching pattern, based on dynamic signaling from the network entity 105-*d***, or both.

At 510, the UE **115-*e* may receive additional control signaling indicating a transition from a first DRX configuration to a second DRX configuration. In other words, the network entity 105-*d* may output (e.g., transmit) a control message which indicates for the UE 115-*e* to switch between DRX configurations which were indicated/configured via the control signaling at 505. The additional control signaling at 510 may include DCI signaling, MAC-CE signaling, or both. Moreover, the network entity 105-*d* may transmit (and the UE 115-*e* may receive) the additional control signaling at 510 based on transmitting/receiving the control signaling at 505**.

Stated differently, the network entity **105-*d* may transmit dynamic signaling to cause the UE 115-*e*** to transition between DRX configurations. In this regard, in some aspects, the additional control signaling may indicate an activation of the second DRX configuration, a deactivation of the first DRX configuration, or both.

At 515, the UE 115-*e*, the network entity 105-*d*, or both, may transition from the first DRX configuration to the second DRX configuration. In other words, the UE 115-*e* and the network entity 105-*d* may transition between candidate DRX configurations which were configured via the control signaling at 505.

As noted previously herein, the UE 115-*e*, the network entity 105-*d*, or both, may transition between the first and second DRX configurations at 515 in accordance with the DRX switching pattern, based on the dynamic signaling at 510, or both. For example, the UE 115-*e* and the network entity 105-*d* may operate in accordance with the first DRX configuration for a time duration specified by the DRX switching pattern, and may transition from the first DRX configuration to the second DRX configuration at the end of the time duration in accordance with the DRX switching pattern.

Additionally, or alternatively, the UE 115-*e* and the network entity 105-*d* may transition between the DRX configurations in response to dynamic signaling (e.g., DCI, MAC-CE) at 510. In such cases, the UE 115-*e* and the network entity 105-*d* may transition between the DRX configurations based on the activation of the second DRX configuration indicated at 510, the deactivation of the first DRX configuration indicated at 510, or both.

At 520, the UE 115-*e* and the network entity 105-*d* may communicate with one another in accordance with the second DRX configuration. In particular, the UE 115-*e* and the network entity 105-*d* may communicate with one another during the active duration of the second DRX configuration. In this regard, the UE 115-*e* and the network entity 105-*d* may communicate with one another in accordance with the second DRX configuration at 520 based on receiving/transmitting the control signaling at 505, transmitting/receiving the additional control signaling at 510, transitioning to the second DRX configuration at 515, or any combination thereof.

At 525, the UE 115-*e* may receive, from the network entity 105-*d*, a control message that selectively modifies one or more parameters associated with the second DRX configuration. In other words, the network entity 105-*d* may dynamically modify one or more parameters associated with the DRX configuration used for communications between the respective devices. Parameters of DRX configurations which may be selectively modified may include an offset, a cycle length, a timer, or any combination thereof. The control message may include a DCI message, a MAC-CE message, or both.

In some cases, the control message may selectively modify parameters of multiple DRX configurations which were configured at the UE 115-*e* via the control signaling at 505. Moreover, the network entity 105-*d* may selectively modify UE-specific DRX configurations at the UE 115-*d*, C-DRX configurations at the UE 115-*e*, or both. In the case of C-DRX configurations, the network entity 105-*d* may transmit (e.g., broadcast, multicast, groupcast) a control message to a set of UEs 115 to cause the set of UEs 115 to modify the respective parameters of the C-DRX configuration.

At 530, the UE 115-*e*, the network entity 105-*d*, or both, may modify one or more parameters associated with the second DRX configuration. In particular, the UE 115-*e* and the network entity 105-*d* may modify the parameters associated with the second DRX configuration based on the control message indicating the modification at 525. Moreover, in cases where the control message at 525 indicates modifications for multiple DRX configurations, the UE 115-*e* and the network entity 105-*d* may modify the parameters of the multiple DRX configurations at 530.

At 535, the UE 115-*e* and the network entity 105-*d* may communicate with one another in accordance with a modified version of the second DRX configuration. In particular, the UE 115-*e* and the network entity 105-*d* may communicate with one another during an active duration of the modified version of the second DRX configuration. In this regard, the UE 115-*e* and the network entity 105-*d* may communicate with one another in accordance with the modified version of the second DRX configuration at 535 based on receiving/transmitting the control signaling at 505, transmitting/receiving the additional control signaling at 510, transitioning to the second DRX configuration at 515, communicating in accordance with the second DRX configuration at 520, receiving/transmitting the control message at 525, modifying the second DRX configuration at 530, or any combination thereof.

At 540, the UE 115-*e* may receive a control message indicating a transition from the second DRX configuration to a C-DRX configuration. In other words, the network entity 105-*d* may output (e.g., transmit) a control message which indicates for the UE 115-*e* to switch from a UE-specific DRX configuration to a C-DRX configuration which was indicated/configured via the control signaling at 505. The additional control signaling at 540 may include DCI signaling, MAC-CE signaling, or both. Moreover, the network entity 105-*d* may transmit (and the UE 115-*e* may receive) the additional control signaling at 510 based on transmitting/receiving the control signaling at 505.

Stated differently, the network entity 105-*d* may transmit dynamic signaling to cause the UE 115-*e* to transition from a UE-specific DRX configuration to a C-DRX configuration. In this regard, in some aspects, the additional control message at 540 may indicate an activation of the C-DRX configuration, a deactivation of the second DRX configuration, or both.

At 545, the UE 115-*e*, the network entity 105-*d*, or both, may transition from the second DRX configuration to the C-DRX configuration. In other words, the UE 115-*e* and the network entity 105-*d* may transition from a UE-specific DRX configuration to a C-DRX configuration which were configured via the control signaling at 505.

As noted previously herein, the UE 115-*e*, the network entity 105-*d*, or both, may transition between the second DRX configuration and the C-DRX configuration at 545 in accordance with the DRX switching pattern, based on the dynamic signaling at 540, or both. For example, the UE 115-*e* and the network entity 105-*d* may operate in accordance with the second DRX configuration for a time duration specified by the DRX switching pattern, and may transition from the second DRX configuration to the C-DRX configuration at the end of the time duration in accordance with the DRX switching pattern.

Additionally, or alternatively, the UE 115-*e* and the network entity 105-*d* may transition between the DRX configurations in response to dynamic signaling (e.g., DCI, MAC-CE) at 540. In such cases, the UE 115-*e* and the network entity 105-*d* may transition between the DRX configurations based on the activation of the C-DRX configuration indicated at 540, the deactivation of the second DRX configuration indicated at 540, or both.

At 550, the UE 115-*e* and the network entity 105-*d* may communicate with one another in accordance with the C-DRX configuration. In particular, the UE 115-*e* and the network entity 105-*d* may communicate with one another during the active duration of the C-DRX configuration. In this regard, the UE 115-*e* and the network entity 105-*d* may communicate with one another in accordance with the C-DRX configuration at 550 based on receiving/transmitting the control signaling at 505, transmitting/receiving the control message at 510, transitioning to the C-DRX configuration at 545, or any combination thereof.

Techniques described herein directed to signaling between the network and UEs 115 may enable UEs 115 to be configured with multiple C-DRX configurations, and to efficiently switch between DRX configurations. By enabling UEs 115 to efficiently transition between DRX configurations, the network may be able to more efficiently accommodate network traffic according to some DRX configurations, while preserving some level of power-saving by aligning DRX configurations across UEs 115 according to other DRX configurations. In particular, the network may configure UEs 115 with a first set of DRX configurations which may accommodate larger traffic volume, and a second set of DRX configurations which facilitate improved power savings at the UE 115 and the network (e.g., DRX configurations with longer inactive durations). As such, by providing techniques which enable UEs 115 and the network to efficiently switch between DRX configurations, techniques described herein may enable the network to more efficiently balance traffic and power-saving considerations.

Figure 6:
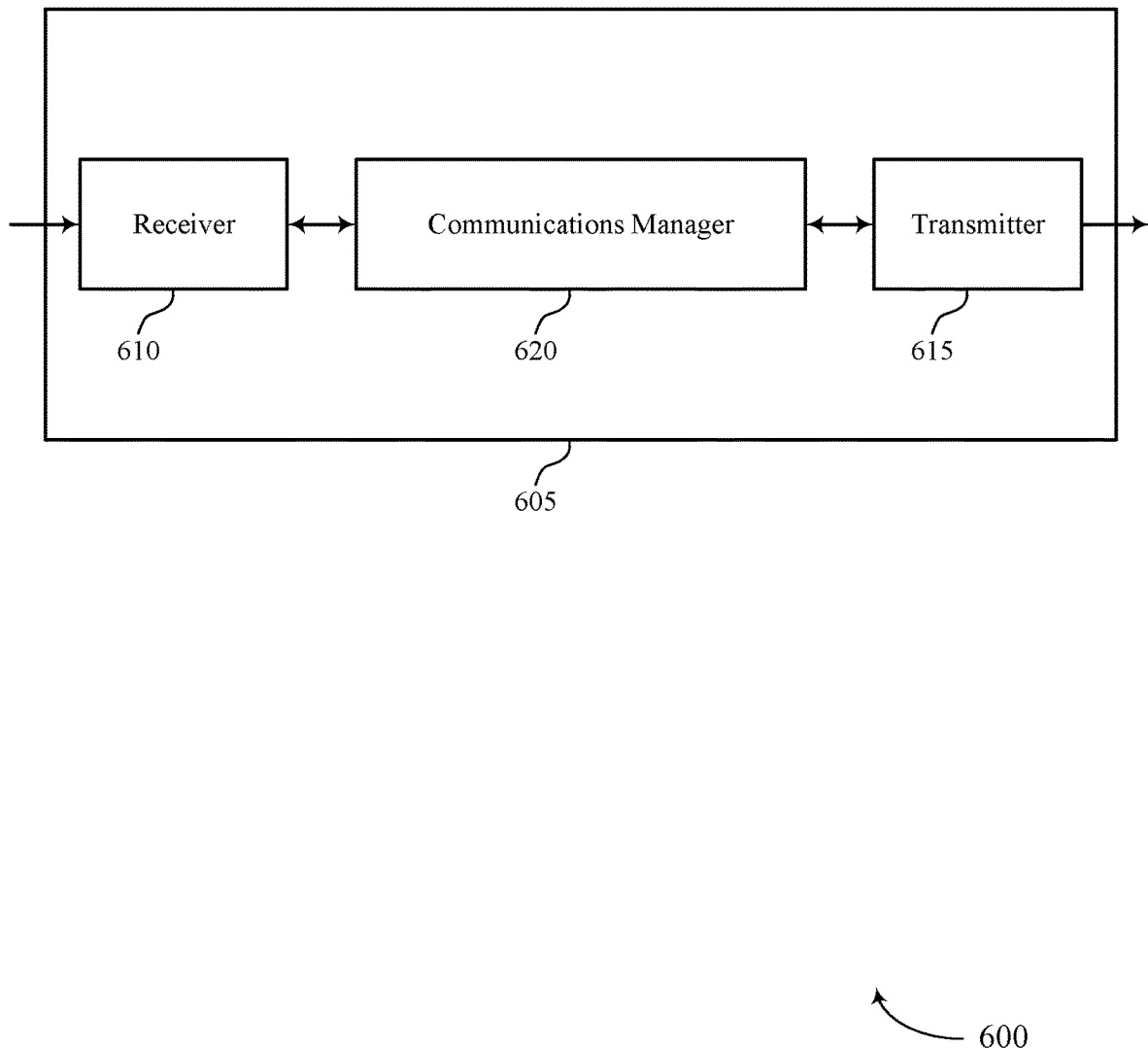
FIGS. 6 and 7 show block diagrams of devices that support techniques for DRX configurations for network energy savings in accordance with one or more aspects of the present disclosure.

FIG. 6 shows a block diagram 600 of a device 605 that supports techniques for DRX configurations for network energy savings in accordance with one or more aspects of the present disclosure. The device 605 may be an example of aspects of a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of techniques for DRX configurations for network energy savings as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network entity in accordance with examples as disclosed herein. For example, the communications manager 620 may be configured as or otherwise support a means for receiving, from a second network entity, a control message indicating a C-DRX configuration associated with a set of multiple UEs communicatively coupled to the first network entity, the C-DRX configuration indicating a time period including an active duration and an inactive duration. The communications manager 620 may be configured as or otherwise support a means for communicating with two or more of the set of multiple UEs in accordance with the indicated C-DRX configuration during the active duration of the time period of the C-DRX configuration.

Additionally, or alternatively, the communications manager 620 may support wireless communication at a second network entity in accordance with examples as disclosed herein. For example, the communications manager 620 may be configured as or otherwise support a means for selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration. The communications manager 620 may be configured as or otherwise support a means for transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

Additionally, or alternatively, the communications manager 620 may support wireless communication at a network entity in accordance with examples as disclosed herein. For example, the communications manager 620 may be configured as or otherwise support a means for transmitting control signaling that indicates a set of multiple DRX configurations associated with a UE, the set of multiple DRX configurations including at least a first DRX configuration and a second DRX configuration. The communications manager 620 may be configured as or otherwise support a means for transitioning from the first DRX configuration to the second DRX configuration based on a DRX switching pattern associated with the set of multiple DRX configurations, based on transmitting additional control signaling indicating a transition from the first DRX configuration to the second DRX configuration, or both. The communications manager 620 may be configured as or otherwise support a means for communicating with the UE during an active duration of the second DRX configuration based on transitioning from the first DRX configuration to the second DRX configuration.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for signaling between components of the network may facilitate efficient identification and selection of C-DRX configurations used for wireless communications between DUs and UEs 115 within the wireless communications system. In particular, techniques described herein may reduce control signaling between DUs and CUs (and between CUs) used for identifying C-DRX configurations, thereby reducing duplicated processing operations, reducing network power consumption, and reducing a latency with which C-DRX configurations are selected and enabled, thereby enabling the network to enter low-power states during inactive durations of the C-DRX configuration. Additionally, the device 605 may support signaling between the network and UEs 115 may enable UEs 115 to be configured with multiple C-DRX configurations, and to efficiently switch between DRX configurations. By enabling UEs 115 to efficiently transition between DRX configurations, the network may be able to more efficiently accommodate network traffic according to some DRX configurations, while preserving some level of power-saving by aligning DRX configurations across UEs 115 according to other DRX configurations.

Figure 7:
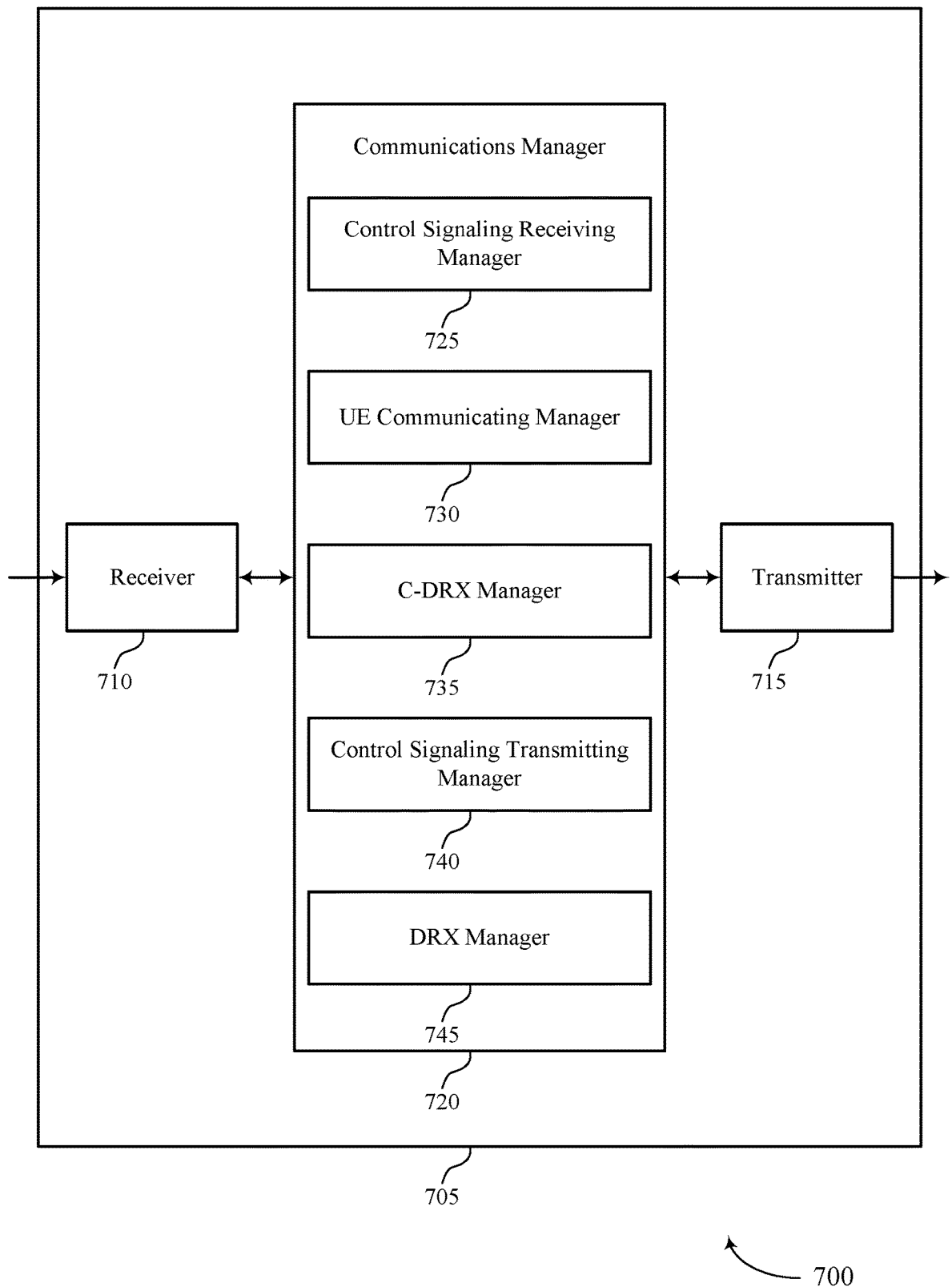

FIG. 7 shows a block diagram 700 of a device 705 that supports techniques for DRX configurations for network energy savings in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of techniques for DRX configurations for network energy savings as described herein. For example, the communications manager 720 may include a control signaling receiving manager 725, a UE communicating manager 730, a C-DRX manager 735, a control signaling transmitting manager 740, a DRX manager 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first network entity in accordance with examples as disclosed herein. The control signaling receiving manager 725 may be configured as or otherwise support a means for receiving, from a second network entity, a control message indicating a C-DRX configuration associated with a set of multiple UEs communicatively coupled to the first network entity, the C-DRX configuration indicating a time period including an active duration and an inactive duration. The UE communicating manager 730 may be configured as or otherwise support a means for communicating with two or more of the set of multiple UEs in accordance with the indicated C-DRX configuration during the active duration of the time period of the C-DRX configuration.

Additionally, or alternatively, the communications manager 720 may support wireless communication at a second network entity in accordance with examples as disclosed herein. The C-DRX manager 735 may be configured as or otherwise support a means for selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration. The control signaling transmitting manager 740 may be configured as or otherwise support a means for transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

Additionally, or alternatively, the communications manager 720 may support wireless communication at a network entity in accordance with examples as disclosed herein. The control signaling transmitting manager 740 may be configured as or otherwise support a means for transmitting control signaling that indicates a set of multiple DRX configurations associated with a UE, the set of multiple DRX configurations including at least a first DRX configuration and a second DRX configuration. The DRX manager 745 may be configured as or otherwise support a means for transitioning from the first DRX configuration to the second DRX configuration based on a DRX switching pattern associated with the set of multiple DRX configurations, based on transmitting additional control signaling indicating a transition from the first DRX configuration to the second DRX configuration, or both. The UE communicating manager 730 may be configured as or otherwise support a means for communicating with the UE during an active duration of the second DRX configuration based on transitioning from the first DRX configuration to the second DRX configuration.

Figure 8:
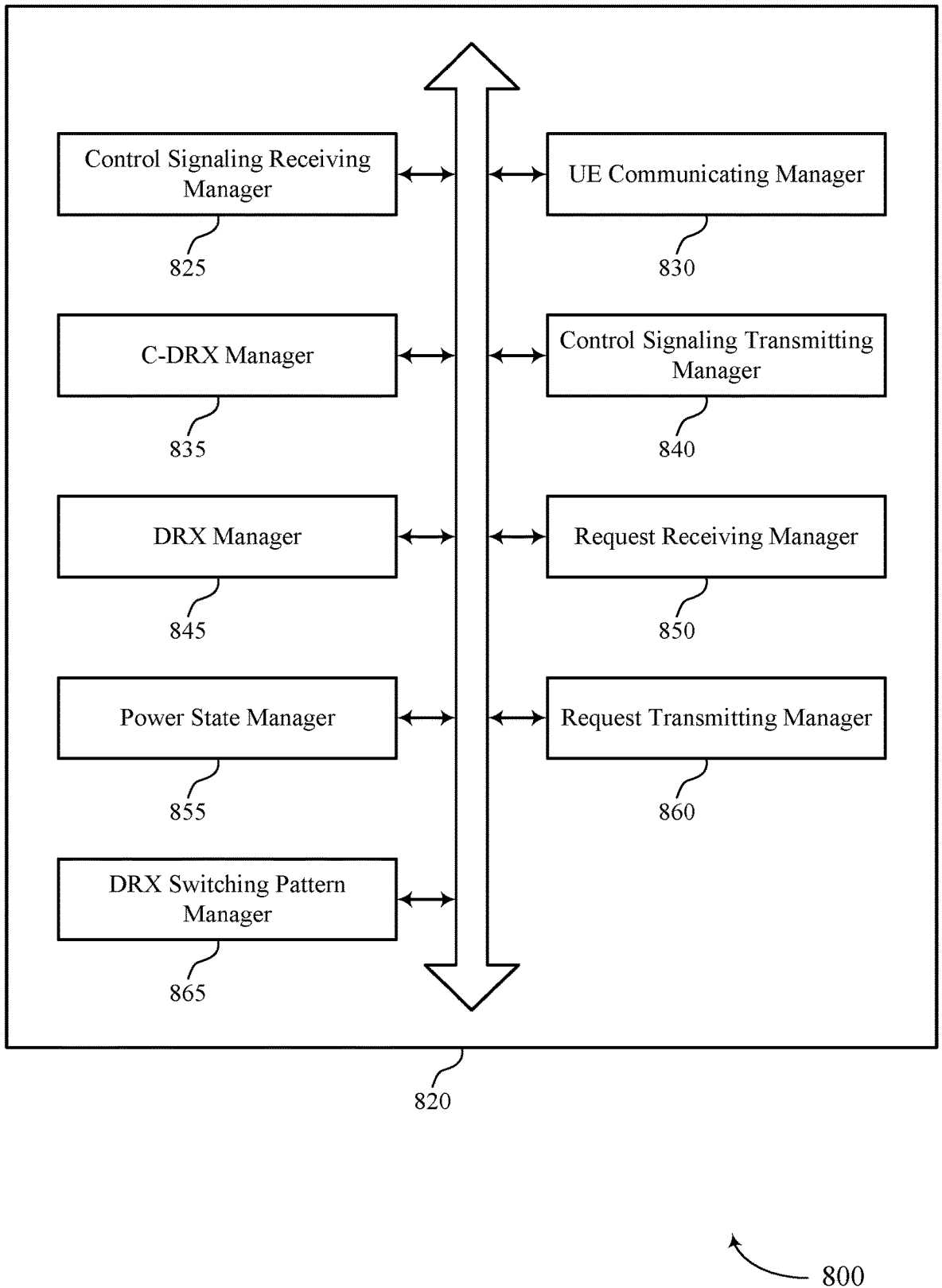
FIG. 8 shows a block diagram of a communications manager that supports techniques for DRX configurations for network energy savings in accordance with one or more aspects of the present disclosure.

FIG. 8 shows a block diagram 800 of a communications manager 820 that supports techniques for DRX configurations for network energy savings in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for DRX configurations for network energy savings as described herein. For example, the communications manager 820 may include a control signaling receiving manager 825, a UE communicating manager 830, a C-DRX manager 835, a control signaling transmitting manager 840, a DRX manager 845, a request receiving manager 850, a power state manager 855, a request transmitting manager 860, a DRX switching pattern manager 865, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communication at a first network entity in accordance with examples as disclosed herein. The control signaling receiving manager 825 may be configured as or otherwise support a means for receiving, from a second network entity, a control message indicating a C-DRX configuration associated with a set of multiple UEs communicatively coupled to the first network entity, the C-DRX configuration indicating a time period including an active duration and an inactive duration. The UE communicating manager 830 may be configured as or otherwise support a means for communicating with two or more of the set of multiple UEs in accordance with the indicated C-DRX configuration during the active duration of the time period of the C-DRX configuration.

In some examples, the control signaling receiving manager 825 may be configured as or otherwise support a means for receiving, from the second network entity, control signaling indicating one or more C-DRX configurations, where the C-DRX configuration is included within the one or more C-DRX configurations, and where receiving the control message is based on the control signaling.

In some examples, the C-DRX manager 835 may be configured as or otherwise support a means for identifying one or more C-DRX configurations based on one or more parameters associated with wireless communications between the first network entity and the set of multiple UEs communicatively coupled to the first network entity, where the C-DRX configuration is included within the one or more C-DRX configurations. In some examples, the control signaling transmitting manager 840 may be configured as or otherwise support a means for transmitting, to the second network entity, a second control message indicating the one or more C-DRX configurations based on identifying the one or more C-DRX configurations, where receiving the control message is based on transmitting the second control message.

In some examples, the C-DRX manager 835 may be configured as or otherwise support a means for receiving, from the second network entity, a second C-DRX configuration associated with a second set of multiple UEs communicatively coupled to a third network entity different from the first network entity, where receiving the control message is based on the second C-DRX configuration.

In some examples, the request transmitting manager 860 may be configured as or otherwise support a means for transmitting, to the second network entity, a request for one or more DRX configurations associated with one or more additional network entities different from the first network entity, where receiving the second C-DRX configuration is based on transmitting the request.

In some examples, the request receiving manager 850 may be configured as or otherwise support a means for receiving, from a UE of the set of multiple UEs, a request for a DRX configuration, where the C-DRX configuration is based on the request.

In some examples, the power state manager 855 may be configured as or otherwise support a means for transitioning from a first power state to a second power state during the inactive duration of the time period of the C-DRX configuration, where the second power state is associated with a lower power consumption compared to the first power state.

In some examples, the first network entity includes a DU. In some examples, the second network entity includes a CU.

In some examples, the control message is received via an F1 interface between the first network entity and the second network entity or an Xn interface between the first network entity and the second network entity.

Additionally, or alternatively, the communications manager 820 may support wireless communication at a second network entity in accordance with examples as disclosed herein. The C-DRX manager 835 may be configured as or otherwise support a means for selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration. The control signaling transmitting manager 840 may be configured as or otherwise support a means for transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

In some examples, the control signaling receiving manager 825 may be configured as or otherwise support a means for receiving a second control message indicating one or more parameters associated with wireless communications between the first network entity and the set of multiple UEs communicatively coupled to the first network entity, where the C-DRX configuration is selected from the set of multiple C-DRX configurations based on the one or more parameters. In some examples, the C-DRX configuration is selected from the set of multiple C-DRX configurations based on a traffic load, a quantity of UEs included within the set of multiple UEs, a second C-DRX configuration associated with a third network entity communicatively coupled to the first network entity, or any combination thereof.

In some examples, the C-DRX manager 835 may be configured as or otherwise support a means for transmitting, to the first network entity, a second C-DRX configuration associated with a second set of multiple UEs communicatively coupled to a third network entity different from the first network entity, where selecting the C-DRX configuration, transmitting the control message, or both, is based on the second C-DRX configuration.

In some examples, the request receiving manager 850 may be configured as or otherwise support a means for receiving, from the first network entity, a request for one or more DRX configurations associated with one or more additional network entities different from the first network entity, where transmitting the second C-DRX configuration is based on receiving the request.

In some examples, the control signaling transmitting manager 840 may be configured as or otherwise support a means for transmitting, to a third network entity, a second control message indicating the C-DRX configuration, where the first network entity includes a first CU, and where the third network entity includes a second CU.

In some examples, the request transmitting manager 860 may be configured as or otherwise support a means for transmitting, to a third network entity, a request for one or more DRX configurations associated with one or more network entities communicatively coupled to the third network entity, where the first network entity includes a first CU, and where the third network entity includes a second CU. In some examples, the C-DRX manager 835 may be configured as or otherwise support a means for receiving, from the third network entity in response to the request, an indication of a second C-DRX configuration, where the C-DRX configuration is selected from the set of multiple C-DRX configurations based on the second C-DRX configuration.

In some examples, the C-DRX configuration is selected from the set of multiple C-DRX configurations based on an algorithm configured to reduce power consumption at the first network entity, the second network entity, or both. In some examples, the first network entity includes a DU. In some examples, the second network entity includes a CU. In some examples, the control message is transmitted to the first network entity via an F1 interface between the first network entity and the second network entity or an Xn interface between the first network entity and the second network entity.

Additionally, or alternatively, the communications manager 820 may support wireless communication at a network entity in accordance with examples as disclosed herein. In some examples, the control signaling transmitting manager 840 may be configured as or otherwise support a means for transmitting control signaling that indicates a set of multiple DRX configurations associated with a UE, the set of multiple DRX configurations including at least a first DRX configuration and a second DRX configuration. The DRX manager 845 may be configured as or otherwise support a means for transitioning from the first DRX configuration to the second DRX configuration based on a DRX switching pattern associated with the set of multiple DRX configurations, based on transmitting additional control signaling indicating a transition from the first DRX configuration to the second DRX configuration, or both. In some examples, the UE communicating manager 830 may be configured as or otherwise support a means for communicating with the UE during an active duration of the second DRX configuration based on transitioning from the first DRX configuration to the second DRX configuration.

In some examples, the DRX switching pattern manager 865 may be configured as or otherwise support a means for transmitting the DRX switching pattern via the control signaling, additional control signaling, or both, where transitioning from the first DRX configuration to the second DRX configuration is based on the DRX switching pattern.

In some examples, the control signaling transmitting manager 840 may be configured as or otherwise support a means for transmitting the additional control signaling indicating an activation of the second DRX configuration, a deactivation of the first DRX configuration, or both, where the additional control signaling includes a DCI message, a MAC-CE message, or both, and where transitioning from the first DRX configuration to the second DRX configuration is based on the activation of the second DRX configuration, the deactivation of the first DRX configuration, or both.

In some examples, the control signaling transmitting manager 840 may be configured as or otherwise support a means for transmitting a control message that selectively modifies one or more parameters associated with the second DRX configuration, the one or more parameters including an offset, a cycle length, a timer, or any combination thereof. In some examples, the UE communicating manager 830 may be configured as or otherwise support a means for communicating with the UE in accordance with a modified version of the second DRX configuration based on the control message.

In some examples, the C-DRX manager 835 may be configured as or otherwise support a means for transmitting, to the UE, one or more C-DRX configurations associated with a set of multiple UEs including the UE, the one or more C-DRX configurations different from the set of multiple DRX configurations. In some examples, the DRX manager 845 may be configured as or otherwise support a means for transmitting, to the UE, a control message activating a C-DRX configuration from the one or more C-DRX configurations at the UE. In some examples, the UE communicating manager 830 may be configured as or otherwise support a means for communicating with the UE during an active duration of the C-DRX configuration based on the control message.

Figure 9:
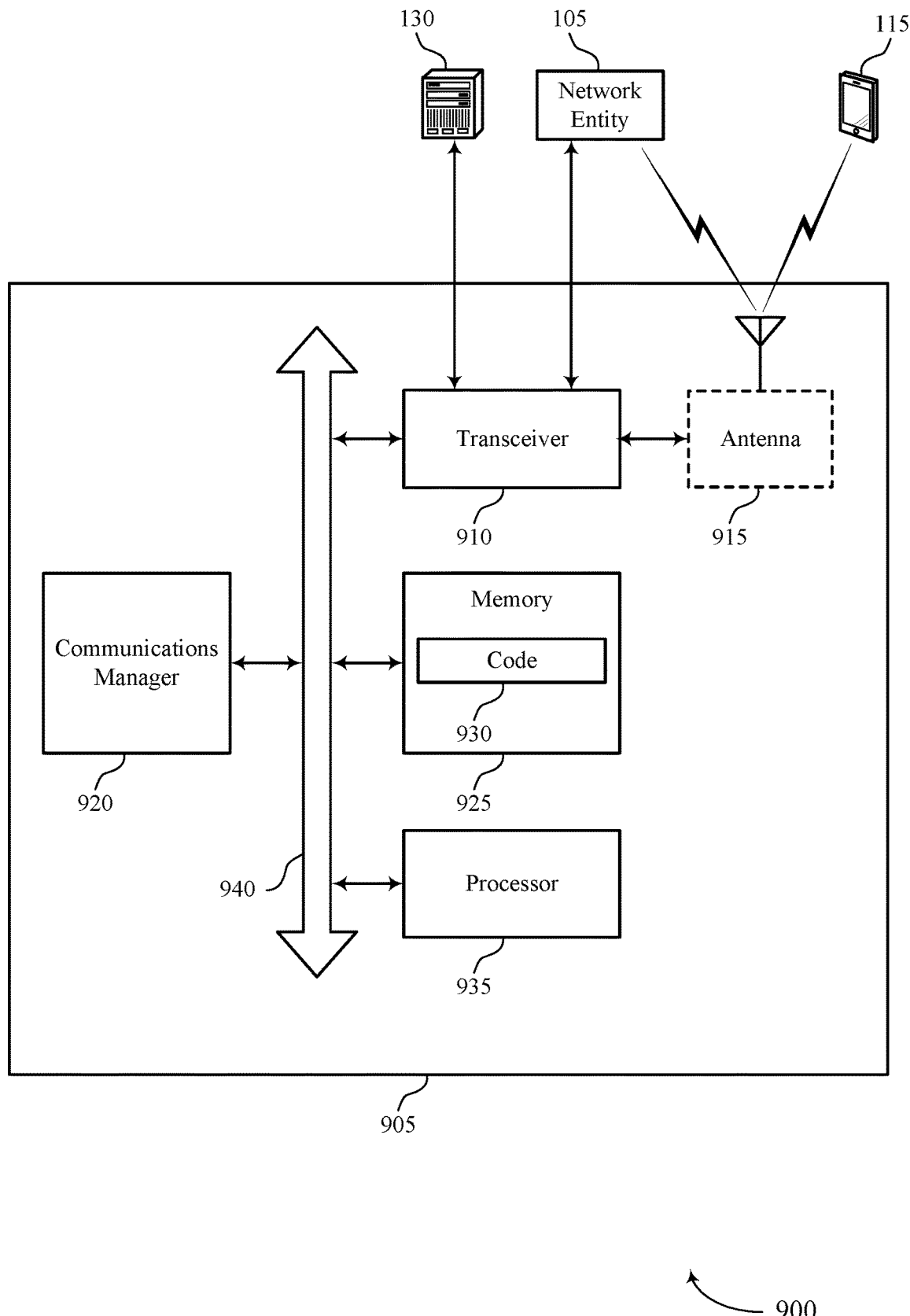
FIG. 9 shows a diagram of a system including a device that supports techniques for DRX configurations for network energy savings in accordance with one or more aspects of the present disclosure.

FIG. 9 shows a diagram of a system 900 including a device 905 that supports techniques for DRX configurations for network energy savings in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. The transceiver 910, or the transceiver 910 and one or more antennas 915 or wired interfaces, where applicable, may be an example of a transmitter 615, a transmitter 715, a receiver 610, a receiver 710, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting techniques for DRX configurations for network energy savings). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communication at a first network entity in accordance with examples as disclosed herein. For example, the communications manager 920 may be configured as or otherwise support a means for receiving, from a second network entity, a control message indicating a C-DRX configuration associated with a set of multiple UEs communicatively coupled to the first network entity, the C-DRX configuration indicating a time period including an active duration and an inactive duration. The communications manager 920 may be configured as or otherwise support a means for communicating with two or more of the set of multiple UEs in accordance with the indicated C-DRX configuration during the active duration of the time period of the C-DRX configuration.

Additionally, or alternatively, the communications manager 920 may support wireless communication at a second network entity in accordance with examples as disclosed herein. For example, the communications manager 920 may be configured as or otherwise support a means for selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration. The communications manager 920 may be configured as or otherwise support a means for transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration.

Additionally, or alternatively, the communications manager 920 may support wireless communication at a network entity in accordance with examples as disclosed herein. For example, the communications manager 920 may be configured as or otherwise support a means for transmitting control signaling that indicates a set of multiple DRX configurations associated with a UE, the set of multiple DRX configurations including at least a first DRX configuration and a second DRX configuration. The communications manager 920 may be configured as or otherwise support a means for transitioning from the first DRX configuration to the second DRX configuration based on a DRX switching pattern associated with the set of multiple DRX configurations, based on transmitting additional control signaling indicating a transition from the first DRX configuration to the second DRX configuration, or both. The communications manager 920 may be configured as or otherwise support a means for communicating with the UE during an active duration of the second DRX configuration based on transitioning from the first DRX configuration to the second DRX configuration.

By including or configuring the communications manager 920 in accordance with examples as described herein, the device 905 may support techniques for signaling between components of the network may facilitate efficient identification and selection of C-DRX configurations used for wireless communications between DUs and UEs 115 within the wireless communications system. In particular, techniques described herein may reduce control signaling between DUs and CUs (and between CUs) used for identifying C-DRX configurations, thereby reducing duplicated processing operations, reducing network power consumption, and reducing a latency with which C-DRX configurations are selected and enabled, thereby enabling the network to enter low-power states during inactive durations of the C-DRX configuration. Additionally, the device 905 may support signaling between the network and UEs 115 may enable UEs 115 to be configured with multiple C-DRX configurations, and to efficiently switch between DRX configurations. By enabling UEs 115 to efficiently transition between DRX configurations, the network may be able to more efficiently accommodate network traffic according to some DRX configurations, while preserving some level of power-saving by aligning DRX configurations across UEs 115 according to other DRX configurations.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the processor 935, the memory 925, the code 930, the transceiver 910, or any combination thereof. For example, the code 930 may include instructions executable by the processor 935 to cause the device 905 to perform various aspects of techniques for DRX configurations for network energy savings as described herein, or the processor 935 and the memory 925 may be otherwise configured to perform or support such operations.

Figure 10:
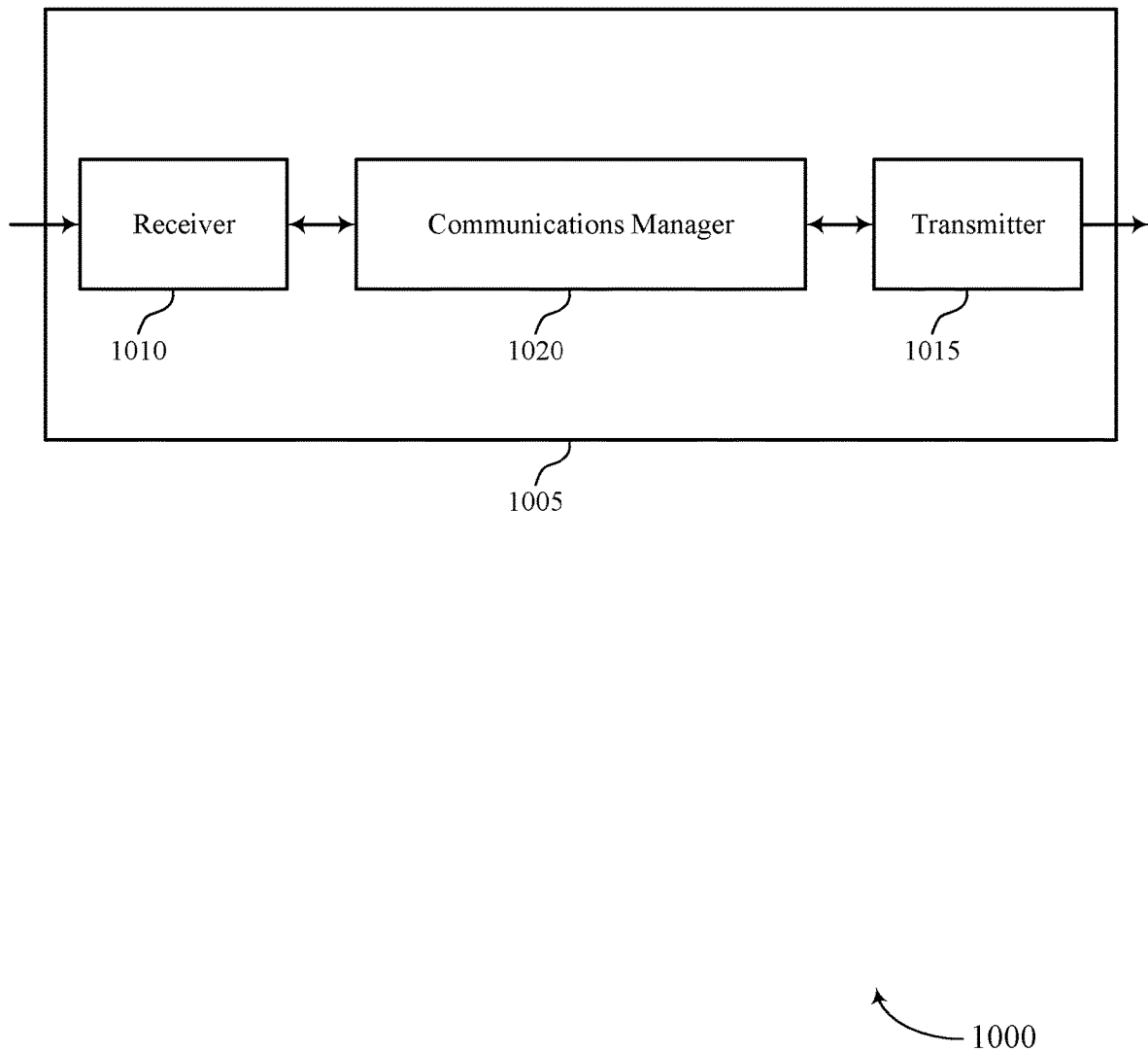
FIGS. 10 and 11 show block diagrams of devices that support techniques for DRX configurations for network energy savings in accordance with one or more aspects of the present disclosure.

FIG. 10 shows a block diagram 1000 of a device 1005 that supports techniques for DRX configurations for network energy savings in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for DRX configurations for network energy savings). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for DRX configurations for network energy savings). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for DRX configurations for network energy savings as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. For example, the communications manager 1020 may be configured as or otherwise support a means for receiving, from a network entity, control signaling indicating a set of multiple DRX configurations, the set of multiple DRX configurations including at least a first DRX configuration and a second DRX configuration. The communications manager 1020 may be configured as or otherwise support a means for transitioning from the first DRX configuration to the second DRX configuration based on a DRX switching pattern associated with the set of multiple DRX configurations, additional control signaling from the network entity, or both. The communications manager 1020 may be configured as or otherwise support a means for communicating with the network entity during an active duration of the second DRX configuration based on transitioning from the first DRX configuration to the second DRX configuration.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for signaling between components of the network may facilitate efficient identification and selection of C-DRX configurations used for wireless communications between DUs and UEs 115 within the wireless communications system. In particular, techniques described herein may reduce control signaling between DUs and CUs (and between CUs) used for identifying C-DRX configurations, thereby reducing duplicated processing operations, reducing network power consumption, and reducing a latency with which C-DRX configurations are selected and enabled, thereby enabling the network to enter low-power states during inactive durations of the C-DRX configuration. Additionally, the device 1005 may support signaling between the network and UEs 115 may enable UEs 115 to be configured with multiple C-DRX configurations, and to efficiently switch between DRX configurations. By enabling UEs 115 to efficiently transition between DRX configurations, the network may be able to more efficiently accommodate network traffic according to some DRX configurations, while preserving some level of power-saving by aligning DRX configurations across UEs 115 according to other DRX configurations.

Figure 11:
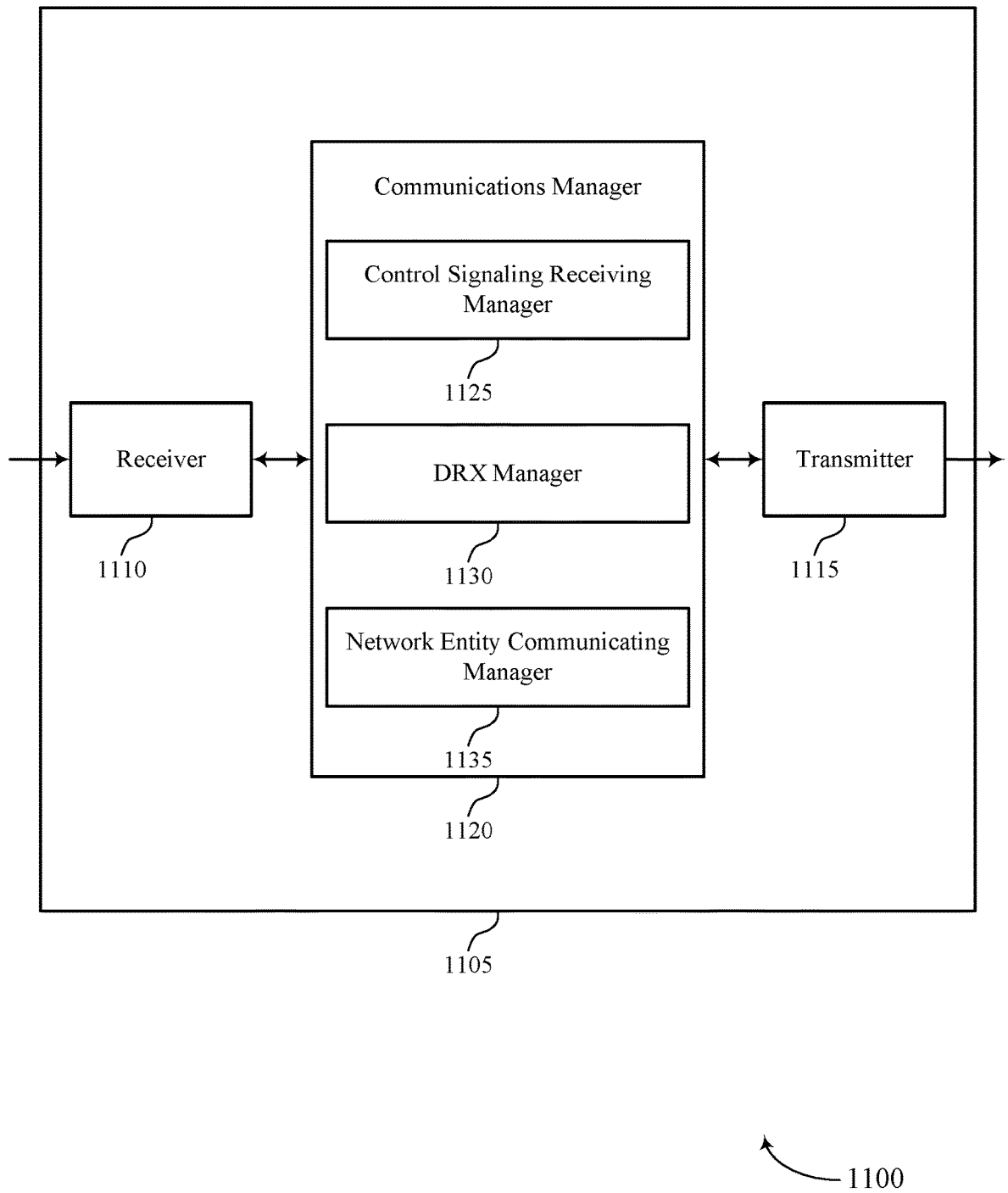

FIG. 11 shows a block diagram 1100 of a device 1105 that supports techniques for DRX configurations for network energy savings in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for DRX configurations for network energy savings). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for DRX configurations for network energy savings). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for DRX configurations for network energy savings as described herein. For example, the communications manager 1120 may include a control signaling receiving manager 1125, a DRX manager 1130, a network entity communicating manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a UE in accordance with examples as disclosed herein. The control signaling receiving manager 1125 may be configured as or otherwise support a means for receiving, from a network entity, control signaling indicating a set of multiple DRX configurations, the set of multiple DRX configurations including at least a first DRX configuration and a second DRX configuration. The DRX manager 1130 may be configured as or otherwise support a means for transitioning from the first DRX configuration to the second DRX configuration based on a DRX switching pattern associated with the set of multiple DRX configurations, additional control signaling from the network entity, or both. The network entity communicating manager 1135 may be configured as or otherwise support a means for communicating with the network entity during an active duration of the second DRX configuration based on transitioning from the first DRX configuration to the second DRX configuration.

Figure 12:
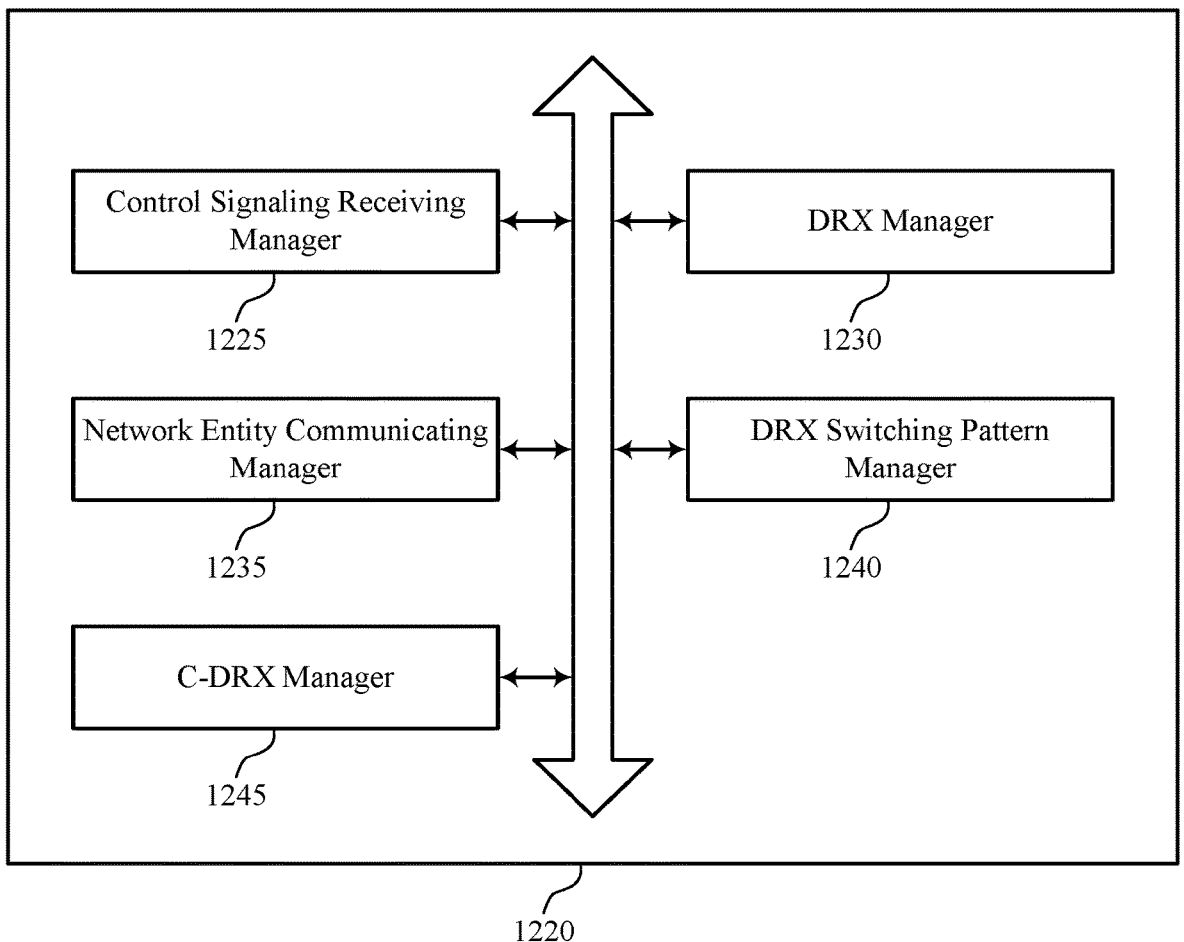
FIG. 12 shows a block diagram of a communications manager that supports techniques for DRX configurations for network energy savings in accordance with one or more aspects of the present disclosure.

FIG. 12 shows a block diagram 1200 of a communications manager 1220 that supports techniques for DRX configurations for network energy savings in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for DRX configurations for network energy savings as described herein. For example, the communications manager 1220 may include a control signaling receiving manager 1225, a DRX manager 1230, a network entity communicating manager 1235, a DRX switching pattern manager 1240, a C-DRX manager 1245, or any combination thereof. Each of these components may communicate, directly or indirectly, with one another (e.g., via one or more buses).

The communications manager 1220 may support wireless communication at a UE in accordance with examples as disclosed herein. The control signaling receiving manager 1225 may be configured as or otherwise support a means for receiving, from a network entity, control signaling indicating a set of multiple DRX configurations, the set of multiple DRX configurations including at least a first DRX configuration and a second DRX configuration. The DRX manager 1230 may be configured as or otherwise support a means for transitioning from the first DRX configuration to the second DRX configuration based on a DRX switching pattern associated with the set of multiple DRX configurations, additional control signaling from the network entity, or both. The network entity communicating manager 1235 may be configured as or otherwise support a means for communicating with the network entity during an active duration of the second DRX configuration based on transitioning from the first DRX configuration to the second DRX configuration.

In some examples, the DRX switching pattern manager 1240 may be configured as or otherwise support a means for receiving the DRX switching pattern via the control signaling, additional control signaling, or both, where transitioning from the first DRX configuration to the second DRX configuration is based on the DRX switching pattern.

In some examples, the control signaling receiving manager 1225 may be configured as or otherwise support a means for receiving, from the network entity, the additional control signaling indicating an activation of the second DRX configuration, a deactivation of the first DRX configuration, or both, where the additional control signaling includes a DCI message, a MAC-CE message, or both, and where transitioning from the first DRX configuration to the second DRX configuration is based on the activation of the second DRX configuration, the deactivation of the first DRX configuration, or both.

In some examples, the DRX manager 1230 may be configured as or otherwise support a means for receiving, from the network entity, a control message that selectively modifies one or more parameters associated with the second DRX configuration, the one or more parameters including an offset, a cycle length, a timer, or any combination thereof. In some examples, the network entity communicating manager 1235 may be configured as or otherwise support a means for communicating with the network entity in accordance with a modified version of the second DRX configuration based on the control message.

In some examples, the C-DRX manager 1245 may be configured as or otherwise support a means for receiving, from the network entity via the control signaling, additional control signaling, or both, one or more C-DRX configurations associated with a set of multiple UEs including the UE, the one or more C-DRX configurations different from the set of multiple DRX configurations. In some examples, the C-DRX manager 1245 may be configured as or otherwise support a means for receiving, from the network entity, a control message activating a C-DRX configuration from the one or more C-DRX configurations at the UE. In some examples, the network entity communicating manager 1235 may be configured as or otherwise support a means for communicating with the network entity during an active duration of the C-DRX configuration based on the control message.

In some examples, the DRX switching pattern indicates a periodicity for switching between the set of multiple DRX configurations, one or more time durations during which the UE is to operate in the set of multiple DRX configurations, or both.

Figure 13:
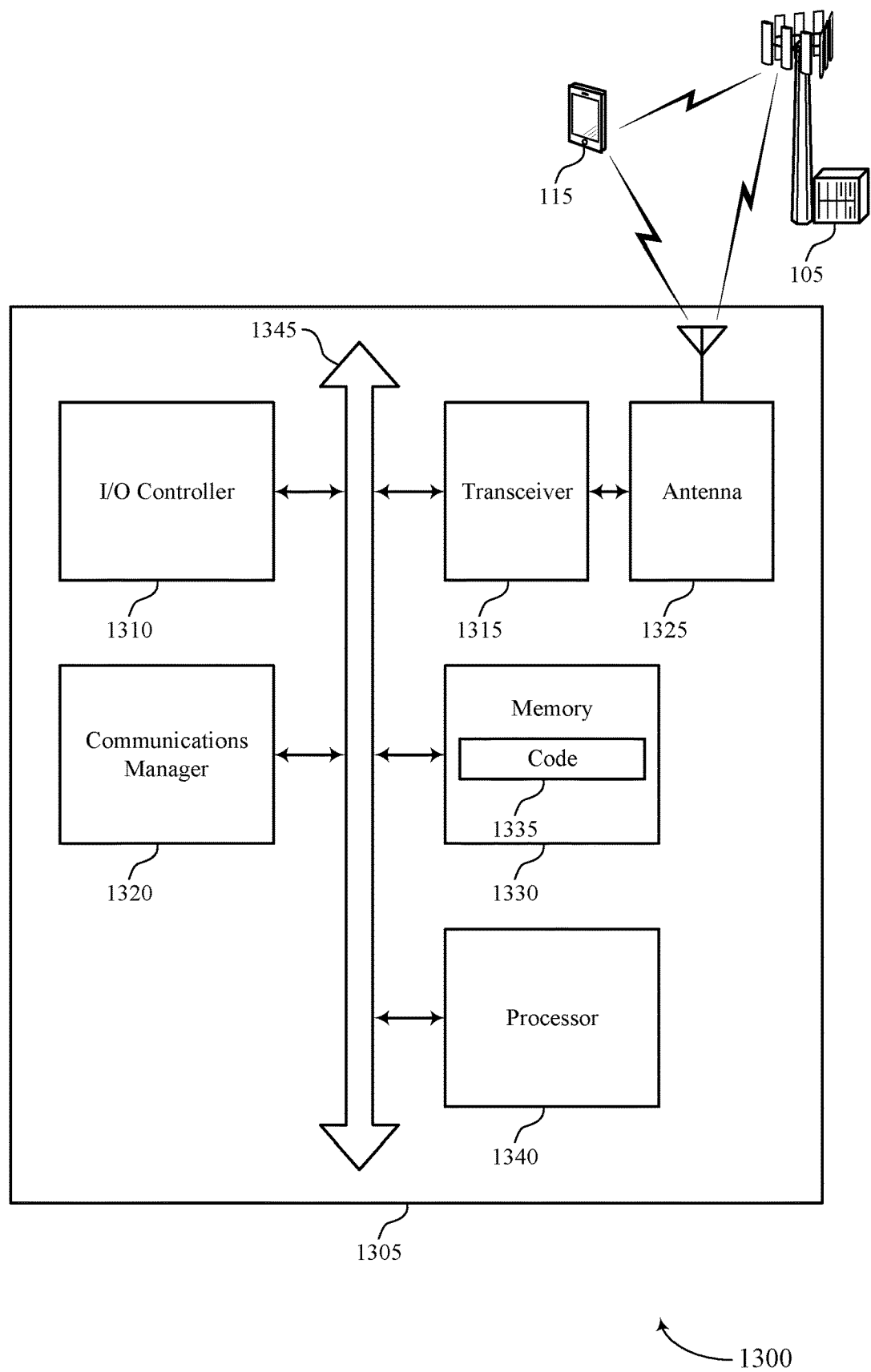
FIG. 13 shows a diagram of a system including a device that supports techniques for DRX configurations for network energy savings in accordance with one or more aspects of the present disclosure.

FIG. 13 shows a diagram of a system 1300 including a device 1305 that supports techniques for DRX configurations for network energy savings in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for DRX configurations for network energy savings). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a network entity, control signaling indicating a set of multiple DRX configurations, the set of multiple DRX configurations including at least a first DRX configuration and a second DRX configuration. The communications manager 1320 may be configured as or otherwise support a means for transitioning from the first DRX configuration to the second DRX configuration based on a DRX switching pattern associated with the set of multiple DRX configurations, additional control signaling from the network entity, or both. The communications manager 1320 may be configured as or otherwise support a means for communicating with the network entity during an active duration of the second DRX configuration based on transitioning from the first DRX configuration to the second DRX configuration.

By including or configuring the communications manager 1320 in accordance with examples as described herein, the device 1305 may support techniques for signaling between components of the network may facilitate efficient identification and selection of C-DRX configurations used for wireless communications between DUs and UEs 115 within the wireless communications system. In particular, techniques described herein may reduce control signaling between DUs and CUs (and between CUs) used for identifying C-DRX configurations, thereby reducing duplicated processing operations, reducing network power consumption, and reducing a latency with which C-DRX configurations are selected and enabled, thereby enabling the network to enter low-power states during inactive durations of the C-DRX configuration. Additionally, the device 1305 may support signaling between the network and UEs 115 may enable UEs 115 to be configured with multiple C-DRX configurations, and to efficiently switch between DRX configurations. By enabling UEs 115 to efficiently transition between DRX configurations, the network may be able to more efficiently accommodate network traffic according to some DRX configurations, while preserving some level of power-saving by aligning DRX configurations across UEs 115 according to other DRX configurations.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for DRX configurations for network energy savings as described herein, or the processor 1340 and the memory 1330 may be otherwise configured to perform or support such operations.

Figure 14:
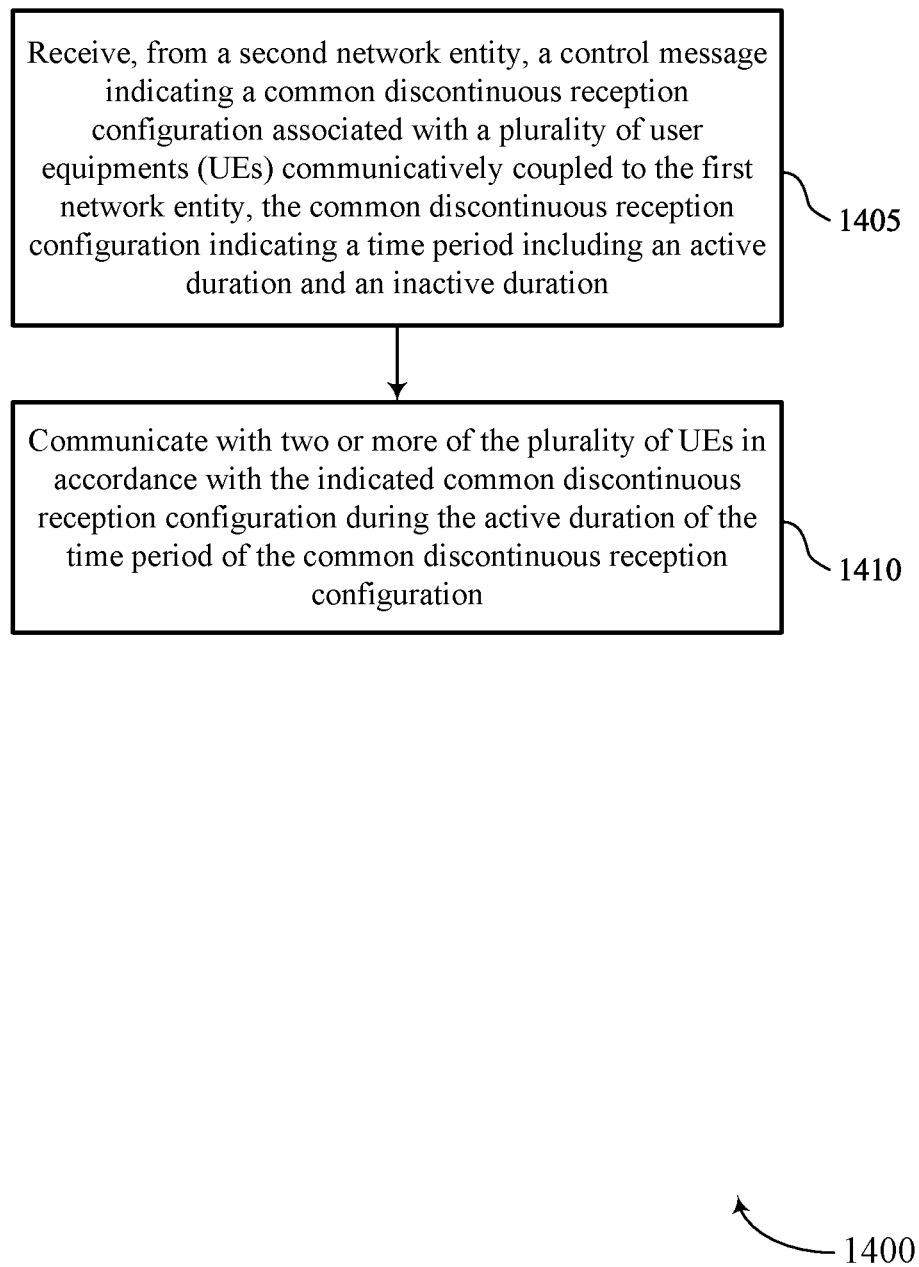
FIGS. 14 through 17 show flowcharts illustrating methods that support techniques for DRX configurations for network energy savings in accordance with one or more aspects of the present disclosure.

FIG. 14 shows a flowchart illustrating a method 1400 that supports techniques for DRX configurations for network energy savings in accordance with one or more aspects of the present disclosure. The operations of the method 1400 may be implemented by a network entity or components of the network entity as described herein. For example, the operations of the method 1400 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a second network entity, a control message indicating a C-DRX configuration associated with a set of multiple UEs communicatively coupled to the first network entity, the C-DRX configuration indicating a time period including an active duration and an inactive duration. The operations of 1405 may be performed in accordance with examples as disclosed herein. In some examples, aspects of the operations of 1405 may be performed by a control signaling receiving manager 825 as described with reference to FIG. 8.

At 1410, the method may include communicating with two or more of the set of multiple UEs in accordance with the indicated C-DRX configuration during the active duration of the time period of the C-DRX configuration. The operations of 1410 may be performed in accordance with examples as disclosed herein. In some examples, aspects of the operations of 1410 may be performed by a UE communicating manager 830 as described with reference to FIG. 8.

Figure 15:
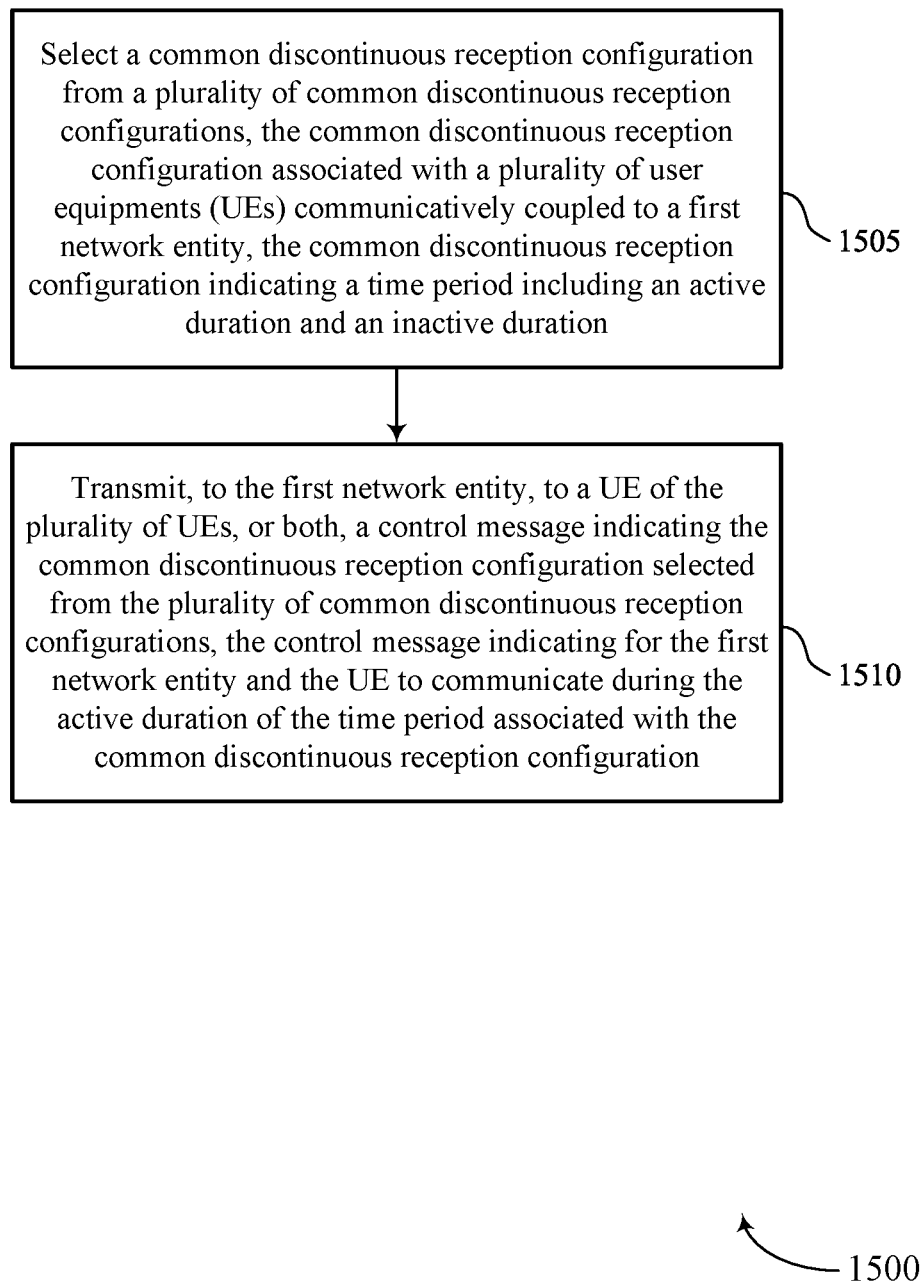

FIG. 15 shows a flowchart illustrating a method 1500 that supports techniques for DRX configurations for network energy savings in accordance with one or more aspects of the present disclosure. The operations of the method 1500 may be implemented by a network entity or components of the network entity as described herein. For example, the operations of the method 1500 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1505, the method may include selecting a C-DRX configuration from a set of multiple C-DRX configurations, the C-DRX configuration associated with a set of multiple UEs communicatively coupled to a first network entity, the C-DRX configuration indicating a time period including an active duration and an inactive duration. The operations of 1505 may be performed in accordance with examples as disclosed herein. In some examples, aspects of the operations of 1505 may be performed by a C-DRX manager 835 as described with reference to FIG. 8.

At 1510, the method may include transmitting, to the first network entity, to a UE of the set of multiple UEs, or both, a control message indicating the C-DRX configuration selected from the set of multiple C-DRX configurations, the control message indicating for the first network entity and the UE to communicate during the active duration of the time period associated with the C-DRX configuration. The operations of 1510 may be performed in accordance with examples as disclosed herein. In some examples, aspects of the operations of 1510 may be performed by a control signaling transmitting manager 840 as described with reference to FIG. 8.

Figure 16:
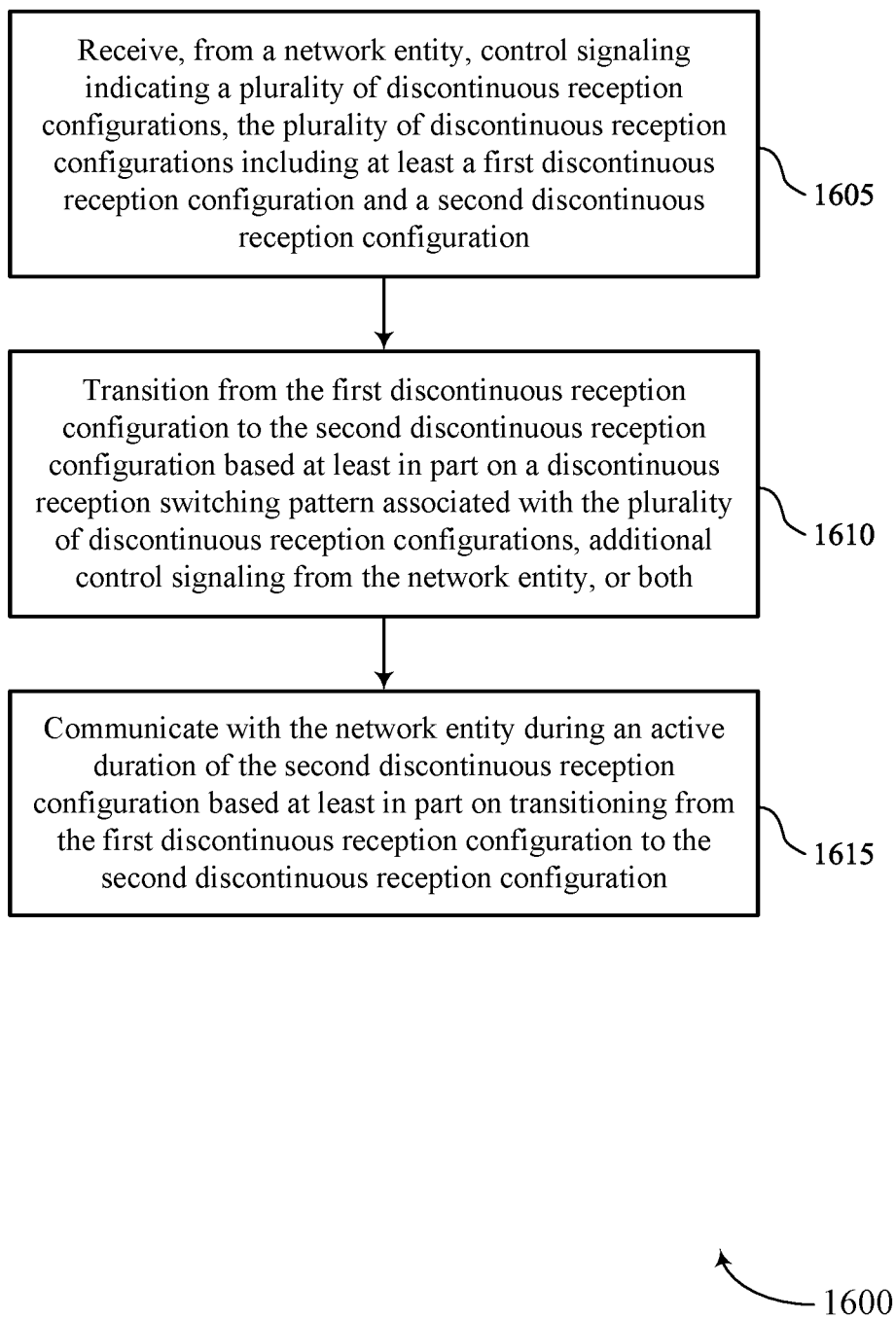

FIG. 16 shows a flowchart illustrating a method 1600 that supports techniques for DRX configurations for network energy savings in accordance with one or more aspects of the present disclosure. The operations of the method 1600 may be implemented by a UE or components of the network entity as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, control signaling indicating a set of multiple DRX configurations, the set of multiple DRX configurations including at least a first DRX configuration and a second DRX configuration. The operations of 1605 may be performed in accordance with examples as disclosed herein. In some examples, aspects of the operations of 1605 may be performed by a control signaling receiving manager 1225 as described with reference to FIG. 12.

At 1610, the method may include transitioning from the first DRX configuration to the second DRX configuration based on a DRX switching pattern associated with the set of multiple DRX configurations, additional control signaling from the network entity, or both. The operations of 1610 may be performed in accordance with examples as disclosed herein. In some examples, aspects of the operations of 1610 may be performed by a DRX manager 1230 as described with reference to FIG. 12.

At 1615, the method may include communicating with the network entity during an active duration of the second DRX configuration based on transitioning from the first DRX configuration to the second DRX configuration. The operations of 1615 may be performed in accordance with examples as disclosed herein. In some examples, aspects of the operations of 1615 may be performed by a network entity communicating manager 1235 as described with reference to FIG. 12.

Figure 17:
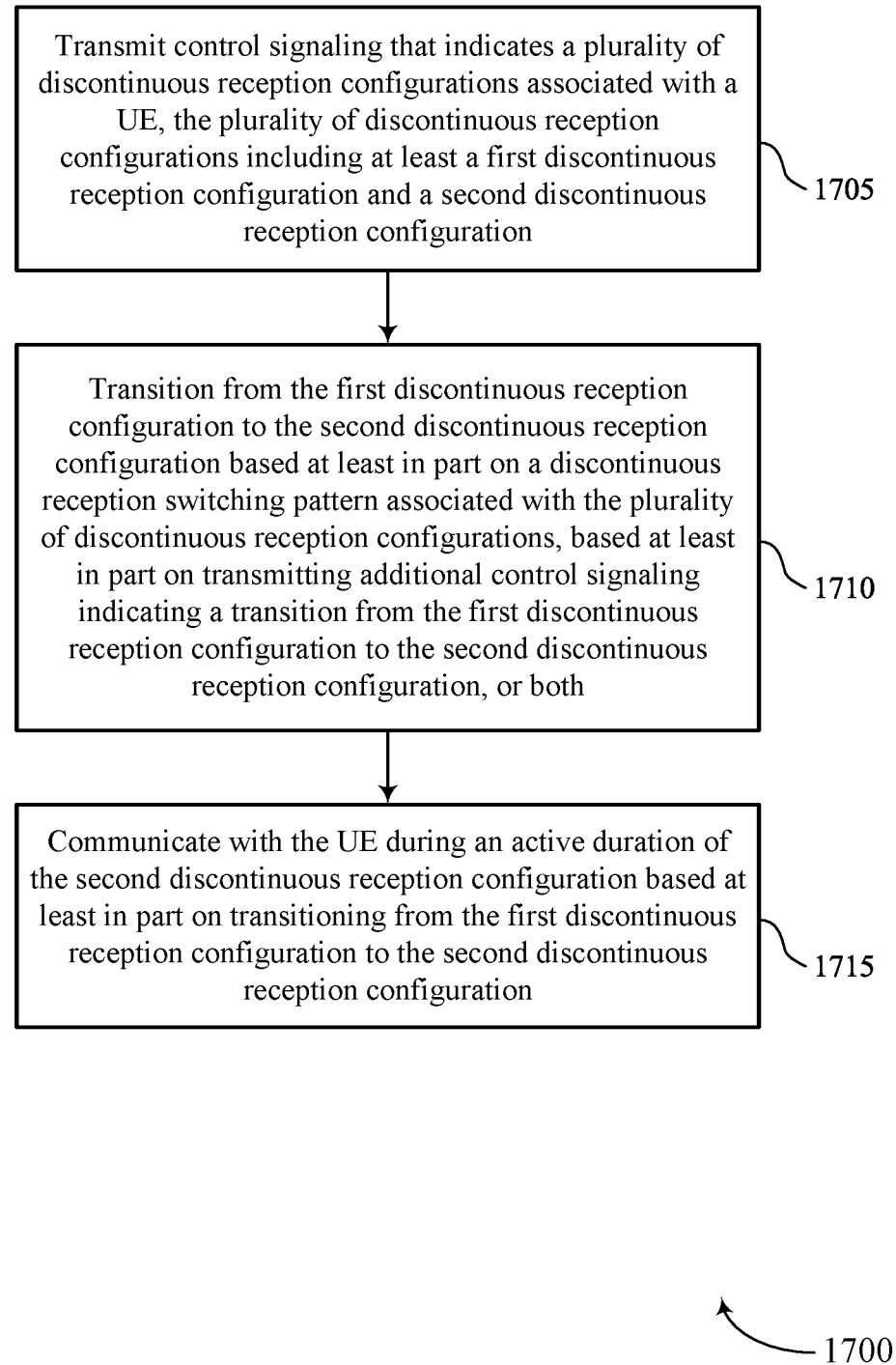

FIG. 17 shows a flowchart illustrating a method 1700 that supports techniques for DRX configurations for network energy savings in accordance with one or more aspects of the present disclosure. The operations of the method 1700 may be implemented by a network entity or components of the network entity as described herein. For example, the operations of the method 1700 may be performed by a network entity as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling that indicates a set of multiple DRX configurations associated with a UE, the set of multiple DRX configurations including at least a first DRX configuration and a second DRX configuration. The operations of 1705 may be performed in accordance with examples as disclosed herein. In some examples, aspects of the operations of 1705 may be performed by a control signaling transmitting manager 840 as described with reference to FIG. 8.

At 1710, the method may include transitioning from the first DRX configuration to the second DRX configuration based on a DRX switching pattern associated with the set of multiple DRX configurations, based on transmitting additional control signaling indicating a transition from the first DRX configuration to the second DRX configuration, or both. The operations of 1710 may be performed in accordance with examples as disclosed herein. In some examples, aspects of the operations of 1710 may be performed by a DRX manager 845 as described with reference to FIG. 8.

At 1715, the method may include communicating with the UE during an active duration of the second DRX configuration based on transitioning from the first DRX configuration to the second DRX configuration. The operations of 1715 may be performed in accordance with examples as disclosed herein. In some examples, aspects of the operations of 1715 may be performed by a UE communicating manager 830 as described with reference to FIG. 8.

The following provides an overview of aspects of the present disclosure:

Aspect 1: A method for wireless communication at a first network entity, comprising: receiving, from a second network entity, a control message indicating a C-DRX configuration associated with a plurality of UEs communicatively coupled to the first network entity, the C-DRX configuration indicating a time period including an active duration and an inactive duration; and communicating with two or more of the plurality of UEs in accordance with the indicated C-DRX configuration during the active duration of the time period of the C-DRX configuration.

Aspect 2: The method of aspect 1, further comprising: receiving, from the second network entity, control signaling indicating one or more C-DRX configurations, wherein the C-DRX configuration is included within the one or more C-DRX configurations, and wherein receiving the control message is based at least in part on the control signaling.

Aspect 3: The method of any of aspects 1 through 2, further comprising: identifying one or more C-DRX configurations based at least in part on one or more parameters associated with wireless communications between the first network entity and the plurality of UEs communicatively coupled to the first network entity, wherein the C-DRX configuration is included within the one or more C-DRX configurations; and transmitting, to the second network entity, a second control message indicating the one or more C-DRX configurations based at least in part on identifying the one or more C-DRX configurations, wherein receiving the control message is based at least in part on transmitting the second control message.

Aspect 4: The method of any of aspects 1 through 3, further comprising: receiving, from the second network entity, a second C-DRX configuration associated with a second plurality of UEs communicatively coupled to a third network entity different from the first network entity, wherein receiving the control message is based at least in part on the second C-DRX configuration.

Aspect 5: The method of aspect 4, further comprising: transmitting, to the second network entity, a request for one or more DRX configurations associated with one or more additional network entities different from the first network entity, wherein receiving the second C-DRX configuration is based at least in part on transmitting the request.

Aspect 6: The method of any of aspects 1 through 5, further comprising: receiving, from a UE of the plurality of UEs, a request for a DRX configuration, wherein the C-DRX configuration is based at least in part on the request.

Aspect 7: The method of any of aspects 1 through 6, further comprising: transitioning from a first power state to a second power state during the inactive duration of the time period of the C-DRX configuration, wherein the second power state is associated with a lower power consumption compared to the first power state.

Aspect 8: The method of any of aspects 1 through 7, wherein the first network entity comprises a DU, and the second network entity comprises a CU.

Aspect 9: The method of any of aspects 1 through 8, wherein the control message is received via an F1 interface between the first network entity and the second network entity or an Xn interface between the first network entity and the second network entity.

Aspect 10: A method for wireless communication at a second network entity, comprising: selecting a C-DRX configuration from a plurality of C-DRX configurations, the C-DRX configuration associated with a plurality of UEs communicatively coupled to a first network entity, the C-DRX configuration indicating a time period including an active duration and an inactive duration; and transmitting, to the first network entity, to a UE of the plurality of UEs, or both, a control message indicating the C-DRX configuration selected from the plurality of C-DRX configurations, the control message indicating for the first network entity and the UE to communicate during the active duration of the time period associated with the C-DRX configuration.

Aspect 11: The method of aspect 10, further comprising: receiving a second control message indicating one or more parameters associated with wireless communications between the first network entity and the plurality of UEs communicatively coupled to the first network entity, wherein the C-DRX configuration is selected from the plurality of C-DRX configurations based at least in part on the one or more parameters.

Aspect 12: The method of any of aspects 10 through 11, wherein the C-DRX configuration is selected from the plurality of C-DRX configurations based at least in part on a traffic load, a quantity of UEs included within the plurality of UEs, a second C-DRX configuration associated with a third network entity communicatively coupled to the first network entity, or any combination thereof.

Aspect 13: The method of any of aspects 10 through 12, further comprising: transmitting, to the first network entity, a second C-DRX configuration associated with a second plurality of UEs communicatively coupled to a third network entity different from the first network entity, wherein selecting the C-DRX configuration, transmitting the control message, or both, is based at least in part on the second C-DRX configuration.

Aspect 14: The method of aspect 13, further comprising: receiving, from the first network entity, a request for one or more DRX configurations associated with one or more additional network entities different from the first network entity, wherein transmitting the second C-DRX configuration is based at least in part on receiving the request.

Aspect 15: The method of any of aspects 10 through 14, further comprising: transmitting, to a third network entity, a second control message indicating the C-DRX configuration, wherein the first network entity comprises a first CU, and wherein the third network entity comprises a second CU.

Aspect 16: The method of any of aspects 10 through 15, further comprising: transmitting, to a third network entity, a request for one or more DRX configurations associated with one or more network entities communicatively coupled to the third network entity, wherein the first network entity comprises a first CU, and wherein the third network entity comprises a second CU; and receiving, from the third network entity in response to the request, an indication of a second C-DRX configuration, wherein the C-DRX configuration is selected from the plurality of C-DRX configurations based at least in part on the second C-DRX configuration.

Aspect 17: The method of any of aspects 10 through 16, wherein the C-DRX configuration is selected from the plurality of C-DRX configurations based at least in part on an algorithm configured to reduce power consumption at the first network entity, the second network entity, or both.

Aspect 18: The method of any of aspects 10 through 17, wherein the first network entity comprises a DU, and the second network entity comprises a CU.

Aspect 19: The method of any of aspects 10 through 18, wherein the control message is transmitted to the first network entity via an F1 interface between the first network entity and the second network entity or an Xn interface between the first network entity and the second network entity.

Aspect 20: A method for wireless communication at a UE, comprising: receiving, from a network entity, control signaling indicating a plurality of DRX configurations, the plurality of DRX configurations including at least a first DRX configuration and a second DRX configuration; transitioning from the first DRX configuration to the second DRX configuration based at least in part on a DRX switching pattern associated with the plurality of DRX configurations, additional control signaling from the network entity, or both; and communicating with the network entity during an active duration of the second DRX configuration based at least in part on transitioning from the first DRX configuration to the second DRX configuration.

Aspect 21: The method of aspect 20, further comprising: receiving the DRX switching pattern via the control signaling, additional control signaling, or both, wherein transitioning from the first DRX configuration to the second DRX configuration is based at least in part on the DRX switching pattern.

Aspect 22: The method of any of aspects 20 through 21, further comprising: receiving, from the network entity, the additional control signaling indicating an activation of the second DRX configuration, a deactivation of the first DRX configuration, or both, wherein the additional control signaling comprises a downlink control information message, a medium access control-control element message, or both, and wherein transitioning from the first DRX configuration to the second DRX configuration is based at least in part on the activation of the second DRX configuration, the deactivation of the first DRX configuration, or both.

Aspect 23: The method of any of aspects 20 through 22, further comprising: receiving, from the network entity, a control message that selectively modifies one or more parameters associated with the second DRX configuration, the one or more parameters comprising an offset, a cycle length, a timer, or any combination thereof; and communicating with the network entity in accordance with a modified version of the second DRX configuration based at least in part on the control message.

Aspect 24: The method of any of aspects 20 through 23, further comprising: receiving, from the network entity via the control signaling, additional control signaling, or both, one or more C-DRX configurations associated with a plurality of UEs including the UE, the one or more C-DRX configurations different from the plurality of DRX configurations; receiving, from the network entity, a control message activating a C-DRX configuration from the one or more C-DRX configurations at the UE; and communicating with the network entity during an active duration of the C-DRX configuration based at least in part on the control message.

Aspect 25: The method of any of aspects 20 through 24, wherein the DRX switching pattern indicates a periodicity for switching between the plurality of DRX configurations, one or more time durations during which the UE is to operate in the plurality of DRX configurations, or both.

Aspect 26: A method for wireless communication at a network entity, comprising: transmitting control signaling that indicates a plurality of DRX configurations associated with a UE, the plurality of DRX configurations including at least a first DRX configuration and a second DRX configuration; transitioning from the first DRX configuration to the second DRX configuration based at least in part on a DRX switching pattern associated with the plurality of DRX configurations, based at least in part on transmitting additional control signaling indicating a transition from the first DRX configuration to the second DRX configuration, or both; and communicating with the UE during an active duration of the second DRX configuration based at least in part on transitioning from the first DRX configuration to the second DRX configuration.

Aspect 27: The method of aspect 26, further comprising: transmitting the DRX switching pattern via the control signaling, additional control signaling, or both, wherein transitioning from the first DRX configuration to the second DRX configuration is based at least in part on the DRX switching pattern.

Aspect 28: The method of any of aspects 26 through 27, further comprising: transmitting the additional control signaling indicating an activation of the second DRX configuration, a deactivation of the first DRX configuration, or both, wherein the additional control signaling comprises a downlink control information message, a medium access control-control element message, or both, and wherein transitioning from the first DRX configuration to the second DRX configuration is based at least in part on the activation of the second DRX configuration, the deactivation of the first DRX configuration, or both.

Aspect 29: The method of any of aspects 26 through 28, further comprising: transmitting a control message that selectively modifies one or more parameters associated with the second DRX configuration, the one or more parameters comprising an offset, a cycle length, a timer, or any combination thereof; and communicating with the UE in accordance with a modified version of the second DRX configuration based at least in part on the control message.

Aspect 30: The method of any of aspects 26 through 29, further comprising: transmitting, to the UE, one or more C-DRX configurations associated with a plurality of UEs including the UE, the one or more C-DRX configurations different from the plurality of DRX configurations; transmitting, to the UE, a control message activating a C-DRX configuration from the one or more C-DRX configurations at the UE; and communicating with the UE during an active duration of the C-DRX configuration based at least in part on the control message.

Aspect 31: An apparatus for wireless communication at a first network entity, comprising a processor; memory coupled with the processor; and instructions stored in the memory and executable by the processor to cause the apparatus to perform a method of any of aspects 1 through 9.

Aspect 32: An apparatus for wireless communication at a first network entity, comprising at least one means for performing a method of any of aspects 1 through 9.

Aspect 33: A non-transitory computer-readable medium storing code for wireless communication at a first network entity, the code comprising instructions executable by a processor to perform a method of any of aspects 1 through 9.

Aspect 34: An apparatus for wireless communication at a second network entity, comprising a processor; memory coupled with the processor; and instructions stored in the memory and executable by the processor to cause the apparatus to perform a method of any of aspects 10 through 19.

Aspect 35: An apparatus for wireless communication at a second network entity, comprising at least one means for performing a method of any of aspects 10 through 19.

Aspect 36: A non-transitory computer-readable medium storing code for wireless communication at a second network entity, the code comprising instructions executable by a processor to perform a method of any of aspects 10 through 19.

Aspect 37: An apparatus for wireless communication at a UE, comprising a processor; memory coupled with the processor; and instructions stored in the memory and executable by the processor to cause the apparatus to perform a method of any of aspects 20 through 25.

Aspect 38: An apparatus for wireless communication at a UE, comprising at least one means for performing a method of any of aspects 20 through 25.

Aspect 39: A non-transitory computer-readable medium storing code for wireless communication at a UE, the code comprising instructions executable by a processor to perform a method of any of aspects 20 through 25.

Aspect 40: An apparatus for wireless communication at a network entity, comprising a processor; memory coupled with the processor; and instructions stored in the memory and executable by the processor to cause the apparatus to perform a method of any of aspects 26 through 30.

Aspect 41: An apparatus for wireless communication at a network entity, comprising at least one means for performing a method of any of aspects 26 through 30.

Aspect 42: A non-transitory computer-readable medium storing code for wireless communication at a network entity, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:
one or more memories storing processor-executable code; and
one or more processors coupled with the one or more memories and individually or collectively operable to execute the code to cause the first network entity to:
communicate with a plurality of user equipments (UEs) in accordance with one or more UE-specific discontinuous reception configurations associated with the plurality of UEs;
transmit control signaling indicating a common discontinuous reception configuration associated with the plurality of UEs communicatively coupled with the first network entity, the common discontinuous reception configuration indicating a time period including an active duration and an inactive duration;
transmit, to the plurality of UEs, additional control signaling indicating an activation of the common discontinuous reception configuration for the plurality of UEs; and
communicate with two or more of the plurality of UEs in accordance with the common discontinuous reception configuration during the active duration of the time period of the common discontinuous reception configuration and based at least in part on the additional control signaling.

2. The first network entity of claim 1, wherein the one or more processors are individually or collectively operable to execute the code to cause the first network entity to:
receive, from a second network entity, a control message indicating one or more common discontinuous reception configurations, wherein the common discontinuous reception configuration is included within the one or more common discontinuous reception configurations, and wherein the control signaling is transmitted based at least in part on the control message.

3. The first network entity of claim 1, wherein the one or more processors are individually or collectively operable to execute the code to cause the first network entity to:
identify one or more common discontinuous reception configurations based at least in part on one or more parameters associated with wireless communications between the first network entity and the plurality of UEs communicatively coupled to the first network entity, wherein the common discontinuous reception configuration is included within the one or more common discontinuous reception configurations; and
transmit, to a second network entity, a second control message indicating the one or more common discontinuous reception configurations based at least in part on identifying the one or more common discontinuous reception configurations.

4. The first network entity of claim 1, wherein the one or more processors are individually or collectively operable to execute the code to cause the first network entity to:
receive, from a second network entity, a second common discontinuous reception configuration associated with a second plurality of UEs communicatively coupled to a third network entity different from the first network entity, wherein the common discontinuous reception configuration is based at least in part on the second common discontinuous reception configuration.

5. The first network entity of claim 4, wherein the one or more processors are individually or collectively operable to execute the code to cause the first network entity to:
transmit, to the second network entity, a request for one or more discontinuous reception configurations associated with one or more additional network entities different from the first network entity, wherein transmitting the control signaling, the additional control signaling, or both, is based at least in part on transmitting the request.

6. The first network entity of claim 1, wherein the one or more processors are individually or collectively operable to execute the code to cause the first network entity to:
receive, from a UE of the plurality of UEs, a request for a discontinuous reception configuration, wherein the common discontinuous reception configuration is based at least in part on the request.

7. The first network entity of claim 1, wherein the one or more processors are individually or collectively operable to execute the code to cause the first network entity to:
transition from a first power state to a second power state during the inactive duration of the time period of the common discontinuous reception configuration, wherein the second power state is associated with a lower power consumption compared to the first power state.

8. The first network entity of claim 1, wherein the first network entity comprises a distributed unit.

9. The first network entity of claim 1, wherein the control signaling comprises a system information message, a radio resource control message, or both, and wherein the additional control signaling comprises a downlink control information message, a medium access control-control element, or both.

10. A second network entity for wireless communication, comprising:
one or more memories storing processor-executable code; and
one or more processors coupled with the one or more memories and individually or collectively operable to execute the code to cause the second network entity to:
select a common discontinuous reception configuration from a plurality of common discontinuous reception configurations, the common discontinuous reception configuration associated with a plurality of user equipments (UEs) communicatively coupled to a first network entity, the common discontinuous reception configuration indicating a time period including an active duration and an inactive duration, wherein the common discontinuous reception configuration is based at least in part on a second common discontinuous reception configuration associated with a second plurality of UEs communicatively coupled with a third network entity different from the first network entity; and transmit, to the first network entity, to a UE of the plurality of UEs, or both, a control message indicating the common discontinuous reception configuration selected from the plurality of common discontinuous reception configurations, the control message indicating for the first network entity and the UE to communicate during the active duration of the time period associated with the common discontinuous reception configuration.

11. The second network entity of claim 10, wherein the one or more processors are individually or collectively operable to execute the code to cause the second network entity to:

receive a second control message indicating one or more parameters associated with wireless communications between the first network entity and the plurality of UEs communicatively coupled to the first network entity, wherein the common discontinuous reception configuration is selected from the plurality of common discontinuous reception configurations based at least in part on the one or more parameters.

12. The second network entity of claim 10, wherein the common discontinuous reception configuration is selected from the plurality of common discontinuous reception configurations based at least in part on a traffic load, a quantity of UEs included within the plurality of UEs, the second common discontinuous reception configuration associated with the third network entity communicatively coupled with the first network entity, or any combination thereof.

13. The second network entity of claim 10, wherein the one or more processors are individually or collectively operable to execute the code to cause the second network entity to:

transmit, to the first network entity, the second common discontinuous reception configuration associated with the second plurality of UEs communicatively coupled with the third network entity, wherein selecting the common discontinuous reception configuration, transmitting the control message, or both, is based at least in part on the second common discontinuous reception configuration.

14. The second network entity of claim 13, wherein the one or more processors are individually or collectively operable to execute the code to cause the second network entity to:

receive, from the first network entity, a request for one or more discontinuous reception configurations associated with one or more additional network entities different from the first network entity, wherein transmitting the second common discontinuous reception configuration is based at least in part on receiving the request.

15. The second network entity of claim 10, wherein the one or more processors are individually or collectively operable to execute the code to cause the second network entity to:

transmit, to an additional network entity, a second control message indicating the common discontinuous reception configuration, wherein the first network entity comprises a first centralized unit, and wherein the additional network entity comprises a second centralized unit.

16. The second network entity of claim 10, wherein the one or more processors are individually or collectively operable to execute the code to cause the second network entity to:

transmit, to an additional network entity, a request for one or more discontinuous reception configurations associated with one or more network entities communicatively coupled to the third network entity, wherein the first network entity comprises a first centralized unit, and wherein the additional third network entity comprises a second centralized unit; and receive, from the additional network entity in response to the request, an indication of the second common discontinuous reception configuration, wherein the common discontinuous reception configuration is selected from the plurality of common discontinuous reception configurations based at least in part on the second common discontinuous reception configuration.

17. The second network entity of claim 10, wherein the common discontinuous reception configuration is selected from the plurality of common discontinuous reception configurations based at least in part on an algorithm configured to reduce power consumption at the first network entity, the second network entity, or both.

18. The second network entity of claim 10, wherein the first network entity comprises a distributed unit, and wherein the second network entity comprises a centralized unit.

19. The second network entity of claim 10, wherein the control message is transmitted to the first network entity via an F1 interface between the first network entity and the second network entity or an Xn interface between the first network entity and the second network entity.

20. A method for wireless communication by a first network entity, comprising:

communicating with a plurality of user equipments (UEs) in accordance with one or more UE-specific discontinuous reception configurations associated with the plurality of UEs;

transmitting control signaling indicating a common discontinuous reception configuration associated with the plurality of UEs communicatively coupled with the first network entity, the common discontinuous reception configuration indicating a time period including an active duration and an inactive duration;

transmitting, to the plurality of UEs, additional control signaling indicating an activation of the common discontinuous reception configuration for the plurality of UEs; and communicating with two or more of the plurality of UEs in accordance with the common discontinuous reception configuration during the active duration of the time period of the common discontinuous reception configuration and based at least in part on the additional control signaling.

21. The method of claim 20, further comprising:
receiving, from a second network entity, a control message indicating one or more common discontinuous reception configurations, wherein the common discontinuous reception configuration is included within the one or more common discontinuous reception configurations, and wherein the control signaling is transmitted based at least in part on the control message.

22. The method of claim 20, further comprising:
identifying one or more common discontinuous reception configurations based at least in part on one or more parameters associated with wireless communications between the first network entity and the plurality of UEs communicatively coupled to the first network entity, wherein the common discontinuous reception configuration is included within the one or more common discontinuous reception configurations; and transmitting, to a second network entity, a second control message indicating the one or more common discontinuous reception configurations based at least in part on identifying the one or more common discontinuous reception configurations.

23. The method of claim 20, further comprising:
receiving, from a second network entity, a second common discontinuous reception configuration associated with a second plurality of UEs communicatively coupled to a third network entity different from the first network entity, wherein the common discontinuous reception configuration is based at least in part on the second common discontinuous reception configuration.

24. The method of claim 23, further comprising:
transmitting, to the second network entity, a request for one or more discontinuous reception configurations associated with one or more additional network entities different from the first network entity, wherein transmitting the control signaling, the additional control signaling, or both, is based at least in part on transmitting the request.

25. A method for wireless communication by a second network entity, comprising:
selecting a common discontinuous reception configuration from a plurality of common discontinuous reception configurations, the common discontinuous reception configuration associated with a plurality of user equipments (UEs) communicatively coupled to a first network entity, the common discontinuous reception configuration indicating a time period including an active duration and an inactive duration, wherein the common discontinuous reception configuration is based at least in part on a second common discontinuous reception configuration associated with a second plurality of UEs communicatively coupled with a third network entity different from the first network entity; and
transmitting, to the first network entity, to a UE of the plurality of UEs, or both, a control message indicating the common discontinuous reception configuration selected from the plurality of common discontinuous reception configurations, the control message indicating for the first network entity and the UE to communicate during the active duration of the time period associated with the common discontinuous reception configuration.

26. The method of claim 25, further comprising:
receiving a second control message indicating one or more parameters associated with wireless communications between the first network entity and the plurality of UEs communicatively coupled to the first network entity, wherein the common discontinuous reception configuration is selected from the plurality of common discontinuous reception configurations based at least in part on the one or more parameters.

27. The method of claim 25, wherein the common discontinuous reception configuration is selected from the plurality of common discontinuous reception configurations based at least in part on a traffic load, a quantity of UEs included within the plurality of UEs, the second common discontinuous reception configuration associated with the third network entity communicatively coupled with the first network entity, or any combination thereof.

28. The method of claim 25, further comprising:
transmitting, to the first network entity, the second common discontinuous reception configuration associated with the second plurality of UEs communicatively coupled with the third network entity, wherein selecting the common discontinuous reception configuration, transmitting the control message, or both, is based at least in part on the second common discontinuous reception configuration.

29. The method of claim 28, further comprising:
receiving, from the first network entity, a request for one or more discontinuous reception configurations associated with one or more additional network entities different from the first network entity, wherein transmitting the second common discontinuous reception configuration is based at least in part on receiving the request.

30. The method of claim 25, further comprising:
transmitting, to an additional network entity, a second control message indicating the common discontinuous reception configuration, wherein the first network entity comprises a first centralized unit, and wherein the additional network entity comprises a second centralized unit.

* * * * *